(12) United States Patent
Nonaka

(10) Patent No.: US 7,184,089 B2
(45) Date of Patent: Feb. 27, 2007

(54) ELECTRONIC CAMERA AND PHOTOGRAPHING COMPOSITION DETERMINATION APPARATUS MOUNTABLE ON ELECTRONIC CAMERA

(75) Inventor: Osamu Nonaka, Sagamihara (JP)

(73) Assignee: Olympus Corporation, Tokyo (JP)

(*) Notice: Subject to any disclaimer, the term of this patent is extended or adjusted under 35 U.S.C. 154(b) by 715 days.

(21) Appl. No.: 10/400,141

(22) Filed: Mar. 26, 2003

(65) Prior Publication Data

US 2003/0185555 A1   Oct. 2, 2003

(30) Foreign Application Priority Data

Mar. 28, 2002 (JP) ............................. 2002-093309
Feb. 28, 2003 (JP) ............................. 2003-054643

(51) Int. Cl.
G03B 13/00 (2006.01)
H04N 5/232 (2006.01)
H04N 5/228 (2006.01)

(52) U.S. Cl. .................... 348/348; 348/222.1; 348/353
(58) Field of Classification Search ................ 348/139, 348/236, 239, 348, 353
See application file for complete search history.

(56) References Cited

U.S. PATENT DOCUMENTS 5,699,444 A * 12/1997 Palm .......................... 382/106
6,262,769 B1 * 7/2001 Anderson et al. .......... 348/333.1
6,430,370 B1 * 8/2002 Nonaka ......................... 396/89
6,625,398 B1 * 9/2003 Nonaka ....................... 396/121

FOREIGN PATENT DOCUMENTS

| JP | 04-067133 | 3/1992 |
| JP | 2000-098456 | 4/2000 |
| JP | 2000-184263 | 6/2000 |
| JP | 2001-091819 | * 4/2001 |

* cited by examiner

Primary Examiner—Ngoc-Yen Vu
Assistant Examiner—Richard M. Bemben
(74) Attorney, Agent, or Firm—Straub and Pokotylo; John C. Pokotylo

(57) ABSTRACT

A photographing composition determination apparatus of an electronic camera includes an area sensor having a plurality of light receiving elements and disposed in an area shape so as to correspond to a photographing scene. A light receiving lens introduces an object image to the area sensor. An A/D converter converts analog signals output from the respective light receiving elements of the area sensor into digital data. A CPU detects the distribution of luminance and the distribution of distances in the photographing scene based on the digital data output from the A/D converter and determines a photographing composition according to the distribution of the luminance and the distribution of the distances.

4 Claims, 15 Drawing Sheets

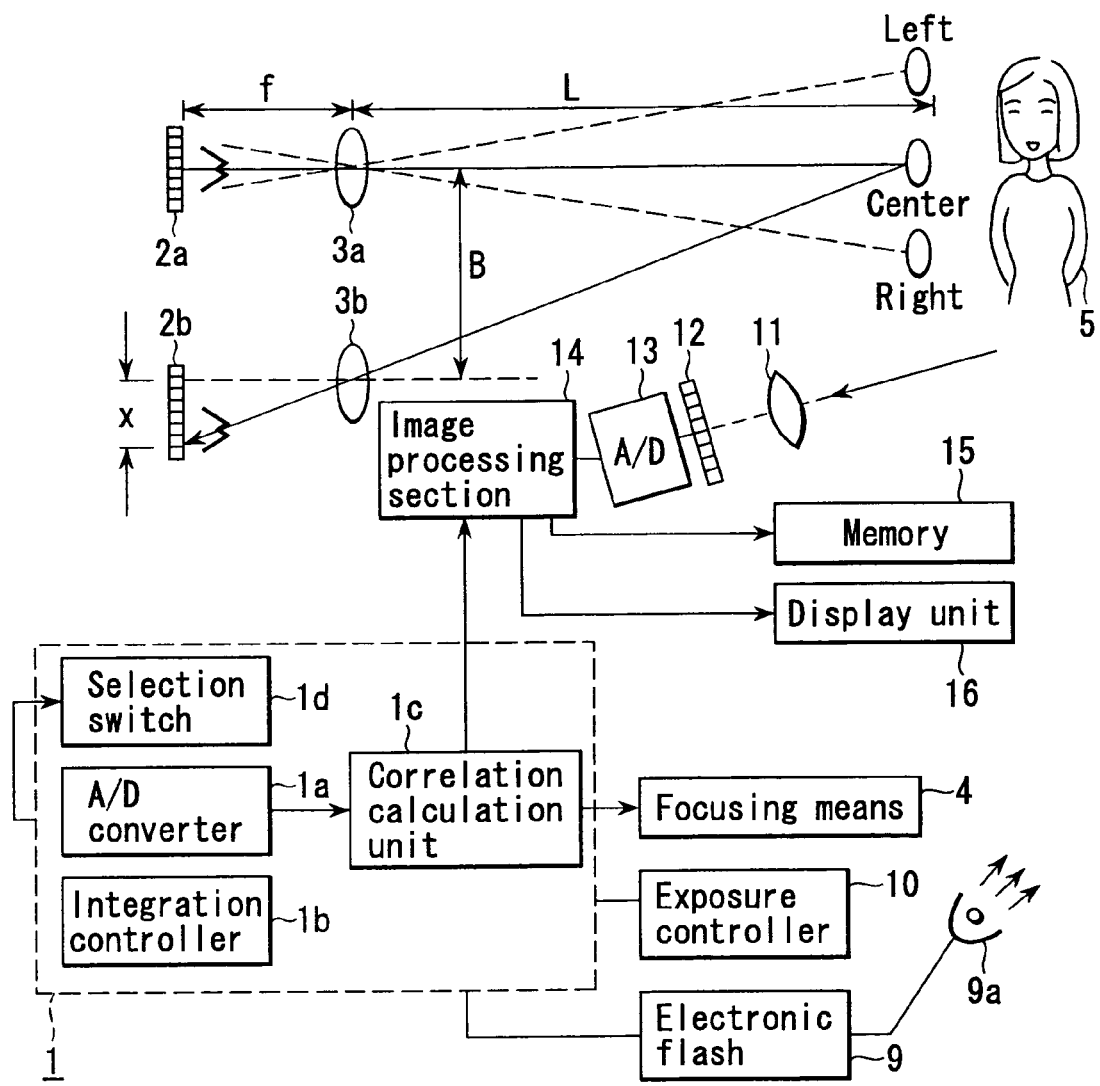
FIG. 1A
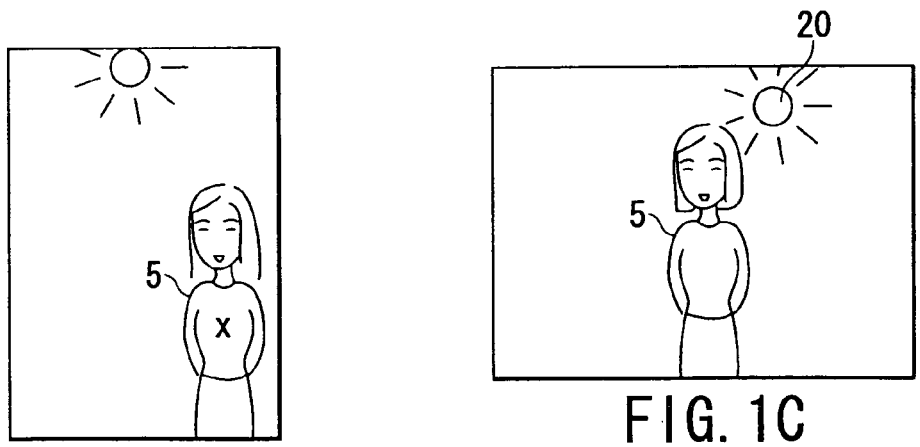
FIG. 1B
FIG. 1C

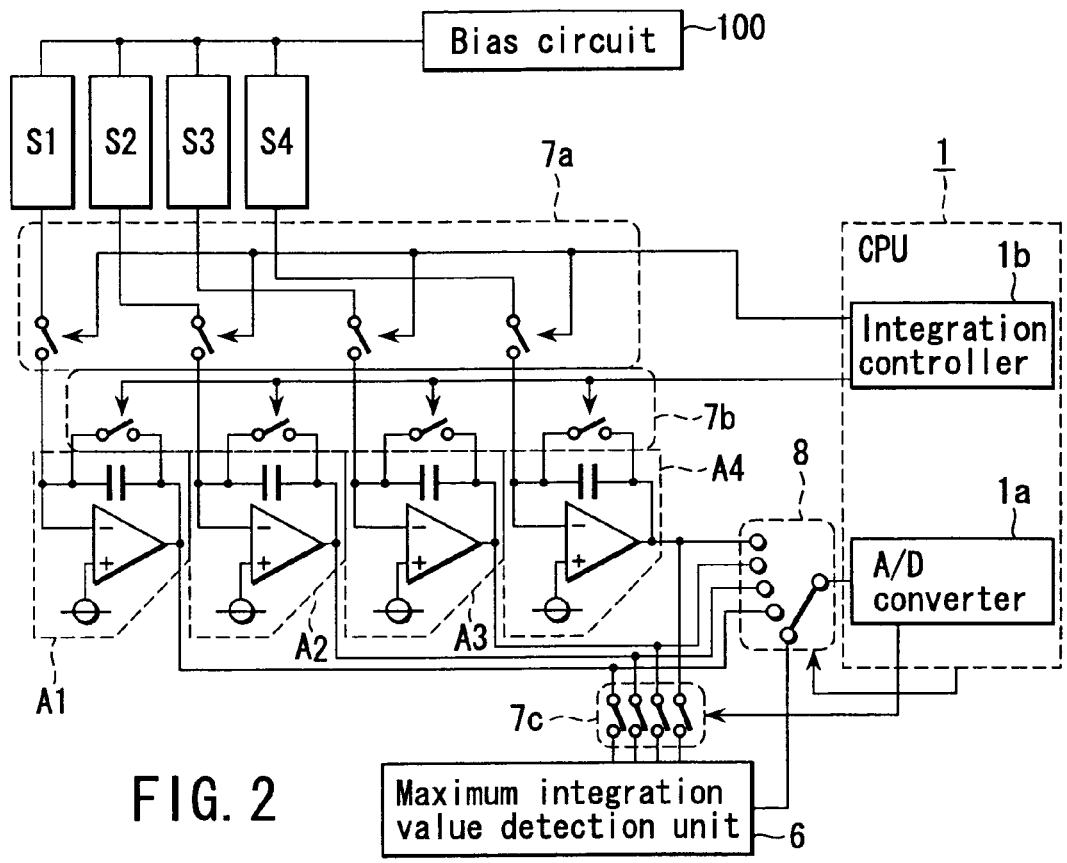
FIG. 2
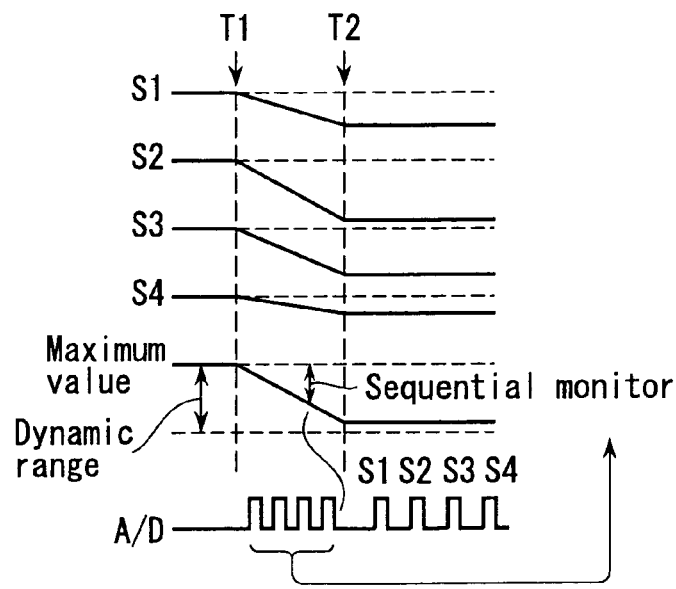
FIG. 3A
FIG. 3B

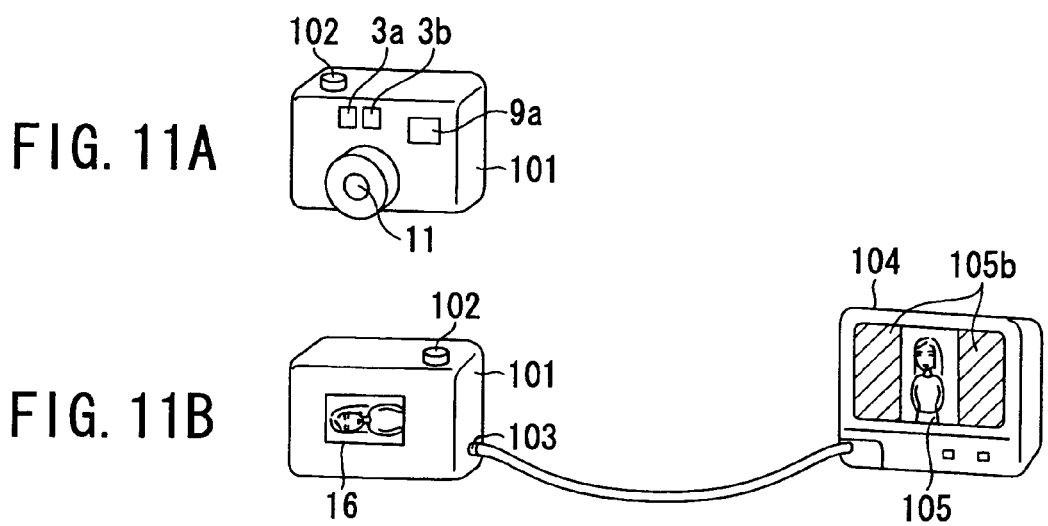
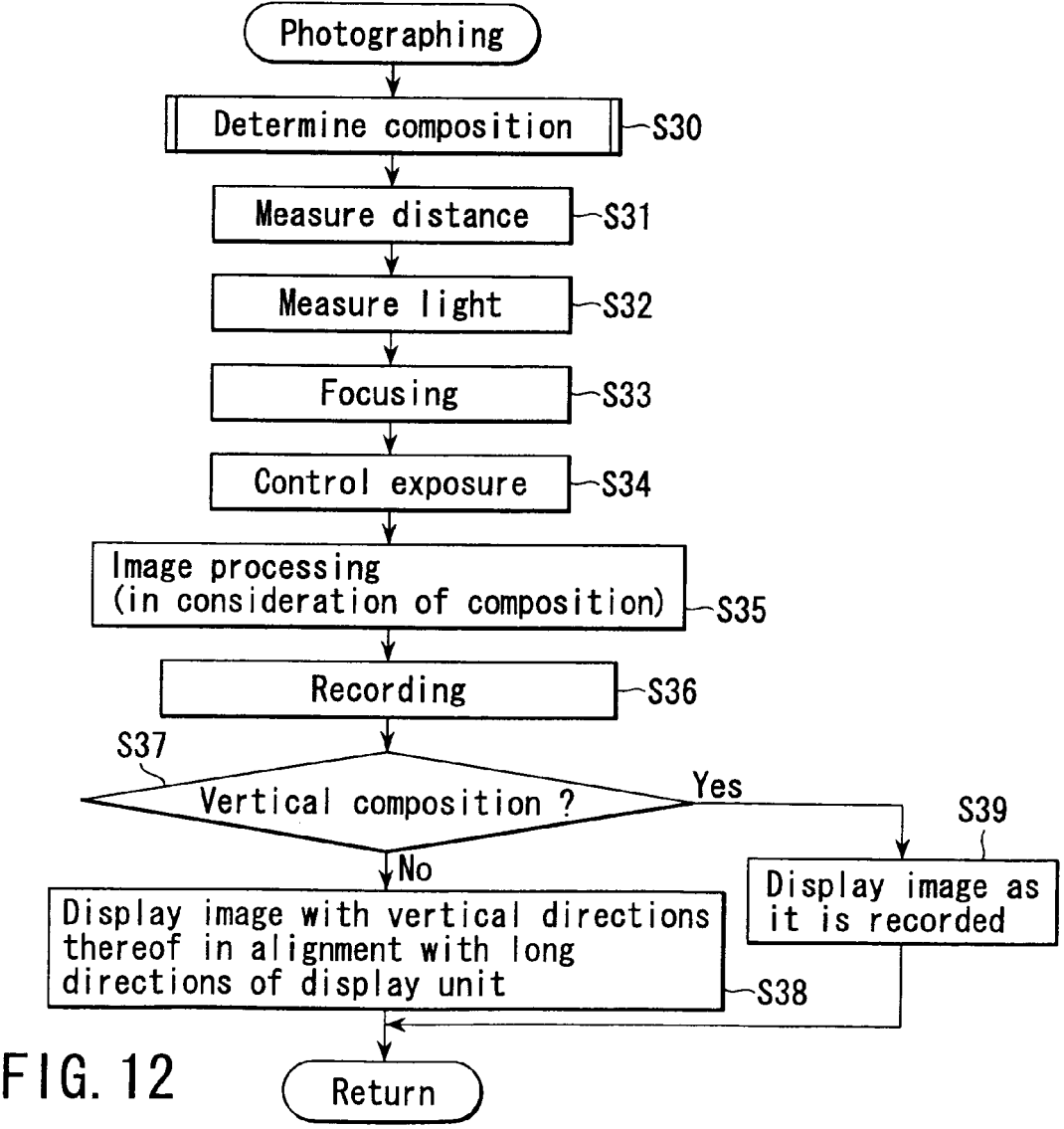

ELECTRONIC CAMERA AND PHOTOGRAPHING COMPOSITION DETERMINATION APPARATUS MOUNTABLE ON ELECTRONIC CAMERA

CROSS-REFERENCE TO RELATED APPLICATIONS

This application is based upon and claims the benefit of priority from the prior Japanese Patent Applications No. 2002-093309, filed Mar. 28, 2002; and No. 2003-054643, filed Feb. 28, 2003, the entire contents of both of which are incorporated herein by reference.

BACKGROUND OF THE INVENTION

1. Field of the Invention

The present invention relates to an electronic camera, such as a digital camera, and the like, for electronically recording an object image, and to a photographing composition determination apparatus mountable on the electronic camera.

2. Description of the Related Art

There are proposed electronic cameras devised to improve usability assuming a mode of use in which users enjoy images photographed by the electronic cameras by replaying them on televisions and the like as a display technology used in the electronic cameras.

For example, as disclosed in Jpn. Pat. Appln. KOKAI Publication No. 2001-33865, there is a technology for recording, together with the image, the attitude information of an electronic camera in photographing, and displaying upright images at all times based on the attitude information when the images are replayed.

However, in the technology disclosed in Jpn. Pat. Appln. KOKAI Publication No. 2001-33865, so-called "determination of longitudinal and lateral compositions" depends on a switch operation executed by a user. Accordingly, a disadvantage has arisen in that the operation is troublesome and that a vertical direction when an image is photographed may not be in agreement with a vertical direction when the image is displayed if a switch is erroneously operated.

Accordingly, an object of the present invention is to provide a photographing composition determination apparatus capable of detecting longitudinal and lateral photographing compositions (attitudes of a camera) without requiring a user to intentionally execute a special operation, and to provide an electronic camera on which the device is mounted.

BRIEF SUMMARY OF THE INVENTION

In order to achieve the above object, according to a first aspect of the present invention, there is provided a photographing composition determination apparatus for an electronic camera, comprising:

an image sensor having a plurality of light receiving elements and disposed in an area shape so as to correspond to a photographing scene;

a light receiving lens which introduces an object image to the image sensor;

an A/D converter which converts analog signals output from the respective light receiving elements of the image sensor into digital data; and a controller which detects the distribution of luminance and the distribution of distances in the photographing scene based on the digital data output from the A/D converter and determines a photographing composition according to the distribution of the luminance and the distribution of the distances.

According to a second aspect of the present invention, there is provided a photographing composition determination apparatus for an electronic camera according to the first aspect, wherein the controller determines whether or not the photographing composition is laterally long by comparing the change in luminance in the short side direction of the photographing scene with the change in luminance in the long side direction thereof.

According to a third aspect of the present invention, there is provided a photographing composition determination apparatus for an electronic camera according to the second aspect, wherein the controller detects the distribution of luminance along the short side direction and the distribution of luminance along the long side direction based on the respective output data from the plurality of light receiving elements, and when the change in distribution of luminance along the short side direction is larger than the change in distribution of luminance along the long side direction, the controller determines that the photographing composition is a laterally long photographing composition.

According to a fourth aspect of the present invention, there is provided a photographing composition determination apparatus for an electronic camera according to the third aspect, wherein the controller adds the respective output data from the plurality of light receiving elements in the short side direction and the long side direction, and detects the distribution of luminance based on the result of addition.

According to a fifth aspect of the present invention, there is provided a photographing composition determination apparatus for an electronic camera according to the first aspect, wherein the controller determines whether or not a photographing composition is laterally long or not by comparing a change in distance in a short side direction of the photographing scene and a change in distance in a long side direction thereof.

According to a sixth aspect of the present invention, there is provided a photographing composition determination apparatus for an electronic camera according to the fifth aspect, wherein the controller compares the distance values at both the ends in the short side direction based on the respective output data from the plurality of light receiving elements, and when the difference between both the distance values is large, the controller determines that the photographing composition is a laterally long photographing composition.

According to a seventh aspect of the present invention, there is provided a photographing composition determination apparatus for an electronic camera according to the fifth aspect, wherein the controller compares the distance values at both the ends in the long side direction based on the respective output data from the plurality of light receiving elements, and when the difference between both the distance values is large, the controller determines that the photographing composition is a vertically long photographing composition, whereas when the difference between both the distance values is small, the controller determines that the photographing composition is a laterally long photographing composition.

According to an eighth aspect of the present invention, there is provided a photographing composition determination apparatus for an electronic camera according to the seventh aspect, wherein the controller compares the distance values at both the ends in the long side direction based on the respective output data from the plurality of light receiving elements, and when the difference between both the distance values is large, the controller determines that the photographing composition is a vertically long photographing composition and that the side showing a far distance is the upper side of the photographing composition.

According to a ninth aspect of the present invention, there is provided a photographing composition determination apparatus for an electronic camera according to the first aspect, wherein when the change in distribution of luminance of the photographing scene in a short side direction is larger than the change in distribution of luminance thereof in a long side direction, when the difference between the distances at both the ends in the short side direction is large, or when the difference between the distances at both the ends in the long side direction is small, the controller determines that the photographing composition is a laterally long composition.

According to a tenth aspect of the present invention, there is provided a photographing composition determination apparatus for an electronic camera according to the first aspect, wherein the light receiving lens comprises a pair of optical systems, the image sensor is divided into two areas in order to receive a pair of object images through the pair of optical systems, and the controller processes an output signal from the image sensor based on a principle of triangulation and calculates distance information at a plurality of points in the photographing scene.

According to an eleventh aspect of the present invention, there is provided a photographing composition determination apparatus for an electronic camera, comprising:

an image sensor having a plurality of light receiving elements and disposed in an area shape so as to correspond to a photographing scene;

an illumination unit which irradiates light to the photographing scene;

a light receiving lens which introduces light reflected from an object of the illumination light irradiated from the illumination unit to the image sensor;

an A/D converter which converts analog signals output from the respective light receiving elements of the image sensor into digital data; and a controller which detects the distribution of the reflected light in the photographing scene based on the digital data output from the A/D converter and determines a photographing composition according to the distribution of the reflected light, wherein the controller compares the change in distribution of the reflected light in the long side direction of the photographing scene with the change in distribution of the reflected light in the short side direction thereof, and when the change in distribution of the reflected light in the long side direction is larger than that in the short side direction, the controller determines that the photographing composition is a vertically long photographing composition, whereas when the change in distribution of the reflected light in the short side direction is larger than that in the long side direction, the controller determines that the photographing composition is a laterally long photographing composition.

According to a twelfth aspect of the present invention, there is provided a photographing composition determination apparatus for an electronic camera according to the eleventh aspect, wherein the controller can determine the upper side of the photographing scene based on the distribution of reflected light in the long side direction of the photographing scene.

According to a thirteenth aspect of the present invention, there is provided a photographing composition determination apparatus for an electronic camera according to the eleventh aspect, wherein the illumination unit comprises an electronic flash.

According to a fourteenth aspect of the present invention, there is provided a photographing composition determination apparatus for an electronic camera, comprising:

image sensors which receive an object image through a photographing lens and outputs image signals according to the object image;

an A/D converter which converts the image signals into digital image data; and a controller which detects the distance values of an object at a plurality of points in the photographing scene based on the digital image data and determines the up/down direction of the photographing scene based on the distribution of the distance values of the object.

According to a fifteenth aspect of the present invention, there is provided a photographing composition determination apparatus for an electronic camera according to the fourteenth aspect, wherein the controller detects the contrast, which is obtained from the digital image data, at the plurality of points in the photographing scene and detects the distribution of the distances of the object based on the relationship between the contrast information and the position of the photographing lens.

According to a sixteenth aspect of the present invention, there is provided a photographing composition determination apparatus for an electronic camera, comprising:

image pickup means for obtaining an object image;

image processing means for generating digital image data from an output of the image pickup means;

luminance distribution detection means for detecting the distribution of luminance in a photographing scene based on the digital image data;

distance distribution detection means for detecting the distribution of distances in the photographing scene based on the digital image data; and determination means for determining a photographing composition of the electronic camera based on information as to the distribution of the luminance and information as to the distribution of the distances.

According to a seventeenth aspect of the present invention, there is provided a photographing composition determination apparatus for an electronic camera according to the sixteenth aspect, wherein the determination means includes means for determining whether or not the photographing scene is laterally long by comparing the change in luminance of the photographing scene in the short side direction and the change in luminance thereof in the long side direction.

According to an eighteenth aspect of the present invention, there is provided a photographing composition determination apparatus for an electronic camera according to the sixteenth aspect, wherein the determination means includes means for determining whether the photographing scene is laterally long or vertically long by comparing the change of the distances of the photographing scene in the short side direction with the change in the distances thereof in the long side direction.

According to a nineteenth aspect of the present invention, there is provided a photographing composition determination apparatus for an electronic camera, comprising:

illumination means for irradiating light to a photographing scene;

image pickup means for obtaining an object image when the illumination means irradiates the light;

image processing means for generating digital image data from an output from the image pickup means; and determination means for detecting the distribution of the light reflected from the photographing scene and determining a photographing composition according to the distribution of the reflected light, wherein the determination means compares the change in distribution of the reflected light in the long side direction of the photographing scene with the change in distribution of the reflected light in the short side direction thereof, and when the change in distribution of the reflected light in the long side direction is larger than that in the short side direction, the determination means determines that the photographing composition is a vertically long photographing composition, whereas when the change in distribution of the reflected light in the short side direction is larger than that in the long side direction, the determination means determines that the photographing composition is a laterally long photographing composition.

According to a twentieth aspect of the present invention, there is provided a photographing composition determination apparatus for an electronic camera according to the nineteenth aspect, wherein the determination means includes means for determining the upper side of the photographing scene based on the distribution of reflected light of the photographing scene in the long side direction.

According to a twenty-first aspect of the present invention, there is provided a photographing composition determination apparatus for an electronic camera, comprising:

contrast detection means for detecting contrast information at a plurality of points in a photographing scene obtained through a photographing lens;

distance distribution detection means for detecting the distribution of distances in the photographing scene based on the relationship between the contrast information and the position of the photographing lens; and determination means for determining the up/down direction of the photographing scene based on an output from the distance distribution detection means.

According to a twenty-second aspect of the present invention, there is provided a photographing composition determination apparatus for an electronic camera, comprising:

distance measuring means capable of measuring the distances of a plurality of points in a photographing scene;

selection means for selecting a point at which a main object exists from the plurality of points; and determination means for comparing the measured value of the distance of the selected point with the measured values of the distances of a plurality of points adjacent to the selected point and determining the up/down direction of the photographing scene based on the result of comparison.

According to a twenty-third aspect of the present invention, there is provided a photographing composition determination apparatus for an electronic camera according to the twenty-second aspect, wherein the determination means determines the up/down direction of the photographing scene in consideration of the luminance information of the points other than the selected point.

According to a twenty-fourth aspect of the present invention, there is provided a photographing composition determination apparatus for an electronic camera, comprising:

first distance measurement means for detecting the point of a main object in a photographing scene and outputting distance information of the main object;

second distance measurement means for outputting distance information of a plurality of points adjacent to the point of the main object; and determination means for comparing the distance information output from the first distance measurement means with the distance information output from the second distance measurement means and determining the up/down direction of the photographing scene based on the result of comparison.

According to a twenty-fifth aspect of the present invention, there is provided a photographing composition determination apparatus for an electronic camera according to the twenty-fourth aspect, wherein the first distance measurement means detects the distance information of the main object based on object image information obtained through an optical system other than that of a photographing lens, and the second distance measurement means detects the distance information based on an image signal obtained through the photographing lens.

According to a twenty-sixth aspect of the present invention, there is provided an electronic camera comprising:

an image pickup element to image an object image through a photographing optical system;

image processing means for subjecting an output from the image pickup element to predetermined processing and recording the processed output in a recording medium; and area sensors which detect the distribution of distances and the distribution of luminance of the image in the horizontal and vertical directions of an image, wherein the image processing means determines whether a photographing frame is laterally long or vertically long in photographing based on outputs from the area sensors and executing the image processing according to the information of the photographing frame.

According to a twenty-seventh aspect of the present invention, there is provided an electronic camera according to the twenty-sixth aspect, further comprising display means for displaying an image recorded in the recording medium, wherein the display means causes the long side direction of the display means to be in agreement with the long side direction of the photographing frame in the photographing, according to the information of the photographing frame in the image processing.

According to a twenty-eighth aspect of the present invention, there is provided an electronic camera according to the twenty-sixth aspect, wherein the area sensor is divided into two areas in order to receive the light of a pair of object images through a pair of optical systems.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiment of the invention, and together with the general description given above and the detailed description of the preferred embodiment given below, serve to explain the principles of the invention.

FIGS. 1A to 1C show a camera according to a first embodiment of the present invention and a method of determining an object distance by the camera, wherein FIG. 1A is a view showing a schematic arrangement of the camera, FIG. 1B is a view explaining a vertically long photographing frame of the camera, and FIG. 1C is a view explaining a laterally long photographing frame of the camera;

FIG. 2 is a circuit diagram showing a part of sensor arrays constituting the camera according to the first embodiment of the present invention and configuring elements relating to the sensor arrays in more detail;

FIGS. 3A and 3B shows a photographing function of the camera according to the first embodiment of the present invention, wherein FIG. 3A shows a timing chart when integration control is executed by turning on switches 7c, and FIG. 3B is a graph showing shapes of resultant image signals;

FIGS. 4A and 4B shows a layout of light receiving lenses and the sensor arrays, wherein FIG. 4A is a view explaining light beams, which have passed through the light receiving lenses, are detected by each three rows of the sensor arrays, and FIG. 4B shows a distance measurable region which is enlarged by three rows of a sensor array;

FIGS. 5A to 5C show area sensors, distance measurement points, and distance measurement patterns, wherein FIG. 5A is a view showing a layout of the area sensors, FIG. 5B is a view explaining the distribution of the distance measurement patterns of the area sensors, and FIG. 5C is a view explaining distance measurable points;

FIGS. 6A to FIG. 6C show respective scenes and exposure determination regions when the camera is held in various attitudes, wherein FIG. 6A is a view explaining a laterally long composition, FIG. 6B is a view explaining a vertically long composition, and FIG. 6C is a view explaining the relationship between the two patterns;

FIGS. 9A to 9C show an example of compositions and a change in luminance, wherein FIG. 9A is a view explaining a scene of a laterally long composition, FIG. 9B is a graph showing luminance in a longitudinal direction having a large amount of change, and FIG. 9C is a graph showing luminance in a lateral direction without change;

FIGS. 10A to 10C show an example of compositions and a change in luminance, wherein FIG. 10A is a view explaining a scene of a vertically long composition, FIG. 10B is a graph showing luminance in a longitudinal direction having a large amount of change, and FIG. 10C is a graph showing luminance in a lateral direction having a less amount of change;

FIGS. 11A and 11B show outside appearances of a digital camera to which the present invention is applied, wherein FIG. 11A is a perspective view when the camera is observed from a front side thereof, and FIG. 11B is a perspective view showing a back surface of the camera and a monitor liquid display;

FIG. 12 is a flowchart of a routine showing a sequence which executes "photographing" of the embodiment;

FIGS. 13A to 13C are views explaining a difference between the directions of a photographed image and a displayed image, wherein FIG. 13A is a view explaining an example of an object image photographed by a camera, FIG. 13B is a view explaining the object image displayed in the screen of a television and the like with its upper and lower directions aligned with those of the screen, and FIG. 13C is a view explaining the object image displayed on an LCD of the camera with its long sides aligned with the long directions of the LCD;

DETAILED DESCRIPTION OF THE INVENTION

First Embodiment

Figure 4A:
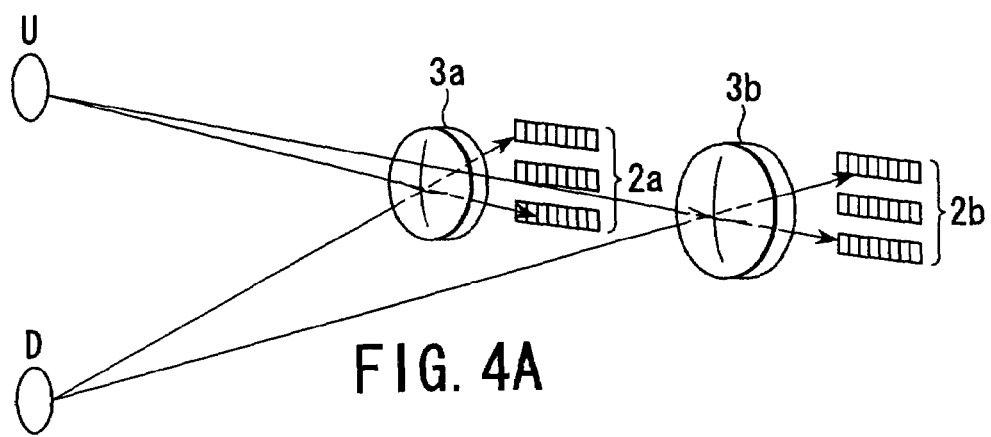

First, a schematic arrangement of an electronic camera according to a first embodiment of the invention will be explained using FIG. 1A. The electronic camera photographs the image of an object 5 by means of a photographing element 12 such as a CCD and the like through a photographing optical system 11. An image signal obtained by the photographing element 12 is converted into digital image data by an A/D conversion circuit 13, subjected to certain image processing in an image processing section 14, and then recorded in a memory 15 acting as a non-volatile recording medium. An exposure controller 10 controls exposure in the photographing, and when the object has low luminance, the object can be illuminated by an electronic flash 9 (including a light emission unit 9a).

Further, a display unit 16 such as a liquid crystal display element and the like is connected to the image processing section 14. The display unit 16 has a function as an electronic view finder and a function for confirming an image after the completion of a photographing operation.

Further, the focus of the photographing optical system 11 is adjusted by focusing means 4, and an amount of focus adjustment in the focusing is output from a focus detection mechanism which will be described later.

Note that all the operations of the camera such as the photographing operation, an image storing operation, the image display operation, the focus adjustment operation, and the like are executed under the control of a CPU 1. The CPU 1 includes at least an A/D converter 1a, an integration controller 1b, a correlation calculation unit 1c, and a selection switch 1d.

Next, the focus detection mechanism of the camera will be explained. The focus detection mechanism has a multi point measurement function capable of measuring a center, a right side, and a left side of a photographing scene. Then, the image of the object 5 (object image) is formed on sensor arrays 2a and 2b through a pair of light receiving lenses 3a and 3b disposed with a predetermined parallax B therebetween. The image (picked-up image) is formed at different relative positions on the two sensor arrays 2a and 2b according to a well-known "principle of triangulation" making use of the parallax B. When the difference x between the relative positions is detected, an object distance L can be determined by a calculation to which an expression L=(B·f)/x is applied according to the focal distance f of the light receiving lenses and the parallax B. When the CPU 1 controls the focusing means 4 according to the result of calculation, the object 5 can be photographed in focus.

The difference between the relative positions x described above can be calculated by the following method. First, the integration operations of the two sensor arrays 2a and 2b are controlled by the integration controller 1b disposed in the CPU 1, and then outputs from the respective sensor arrays 2a and 2b are converted into digital signals by the A/D converter 1a, and the digital signals are stored in a memory (not shown) in the CPU 1. The CPU 1 executes a correlation calculation using a certain program, through the correlation calculation unit 1c using the result of above operation. This is a method of determining "correlation" which is performed as described below. That is, for example, the difference between outputs from the two sensor arrays 2a and 2b is determined while offsetting the sensor arrays 2a and 2b in the direction where they are arranged, and it is determined that "correlation" is high when such an amount of offset between the sensor arrays 2a and 2b that minimizes the difference between the outputs is achieved. The amount of offset and the pitch between the sensor arrays 2a and 2b are values which represent the difference x between the relative positions described above. Note that the selection switch 1d, which selectively switches an input to the A/D converter 1a, is disposed in the CPU 1, and this selection switch 1d will be described later in detail.

Further, FIG. 1B shows an example of display of an image on the display unit 16 when the camera is held vertically, i.e. for portraits and FIG. 1C shows an example of display of an image when the camera is held horizontally, i.e. for landscapes. When the images are photographed, they are stored in the memory 15 as photographs.

FIG. 2 is a detailed view specifically showing a part of the sensor arrays 2a and 2b and configuring elements relating to the sensor arrays. Sensors $S_1$ to $S_4$ are a group of light receiving elements which form the sensor arrays 2a and 2b and have continuous light receiving surfaces. The sensors $S_1$ to $S_4$ output signal currents according to amounts of received light, respectively using a bias circuit 100 acting as a power supply.

When integration start/end switches 7a are turned on, the signal currents are supplied to integration amplifiers $A_1$ to $A_4$, and when reset switches 7b are turned off, voltage signals according to the amounts of received light are supplied to the outputs of the respective amplifiers. When the A/D converter 1a of the CPU 1 reads the result of above operation, focusing can be executed through the correlation calculation explained in FIG. 1A.

Since, however, the amounts of light incident on the respective sensors $S_1$ to $S_4$ are dispersed to various values depending upon the brightness of a photographing scene and the color and the reflectance of an object, an accurate integration control technology is required to set integration amounts to proper values by an integration means having a limited dynamic range. When, for example, an integration time is excessively short, a result of integration is made characteristically flat and a difference cannot be obtained, whereas when the integration time is excessively long, a result of integration is made characteristically uniform due to the saturation phenomenon.

As apparent from the description of the correlation calculation described above, when the change in image is small, it is difficult to obtain the correlation of the two images obtained by the two sensor arrays 2a and 2b, which results in a tendency that a distance cannot be correctly measured.

To cope with this problem, a result of integration is monitored in real time by the CPU 1, and an integration operation is terminated when the result of the integration achieves a proper level. For example, a maximum integration value detection unit 6 detects a maximum integration value of integration outputs which are supplied from the respective sensors $S_1$ to $S_4$ by turning on and off the switches 7c.

FIG. 3A shows a timing chart which executes integration control by turning on the switches 7c, and FIG. 3B shows the shape of a resultant image signal.

When light is incident on the sensors $S_1$ to $S_4$ constituting the sensor arrays 2a and 2b, first, the reset switches 7b are turned on so as to reset outputs to a reference level, and then the integration start/end switches 7a are turned on, and the reset switches 7b are turned off, thereby an integration operation is started at timing T1.

An input to the A/D converter 1a is switched by the selection switch 1d, and an output from the maximum integration value detection unit 6 is connected to the A/D converter 1a through the selection switch 1d. In this case, a sensor output having a largest integration amount (maximum value) is input to the A/D converter 1a. The CPU 1 sequentially monitors the sensor output by driving the A/D converter 1a (FIG. 3A).

Then, the integration start/end switches 7a are turned off at timing T2 at which the maximum value does not exceed the dynamic range of its circuit, thereby the integration outputs of the respective sensors are controlled so as not to exceed the dynamic range. After the interruption of the integration operation, the CPU 1 can sequentially monitor the respective sensor outputs by switching the selection switch 1d so that the integration outputs from the sensors $S_1$ to $S_4$ are subjected to A/D conversion by the A/D converter 1a.

The image signal obtained as described above has a shape as shown in FIG. 3B, and a dark portion of the image signal exhibits a low output and a bright portion thereof exhibits a high output. The above method permits a distance measurement device of the camera to obtain a proper image signal.

Note that, in the arrangement of FIG. 1A, when the light beams shown by dotted lines from the light receiving lens 3a are used, it is possible to measure the distances of points other than the point (center) of the scene, that is, the distances of points offset in a base line direction (left and right) can be also measured.

Figure 4B:
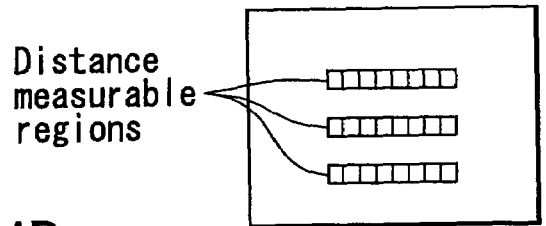

Further, when respective sensor arrays 2a and 2b are additionally disposed above and below behind the light receiving lenses 3a and 3b in a direction vertical to the base line direction so that each of the sensor arrays 2a and 2b is composed of three rows, the distances of portions (U) and (D) in a direction vertical to the base line direction can be measured based on received light beams. Accordingly, the monitor regions of the sensor arrays 2a and 2b are expanded as shown in FIG. 4B, thereby the distances of many points in the screen can be measured.

Figure 5A:
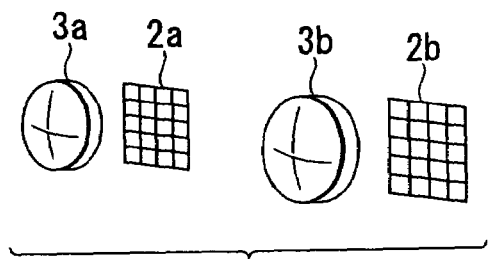
Figure 5C:
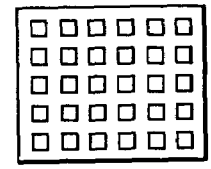

When the above concept is expanded, the screen can be entirely monitored without leaving any unmonitored portion by using "area sensors 2a and 2b" which are arranged continuously as shown in FIG. 5A in place of one or three "line sensors". With this arrangement, the number of measurable points can be increased to, for example, at least 30 points as shown in FIG. 5C.

Figure 6A:
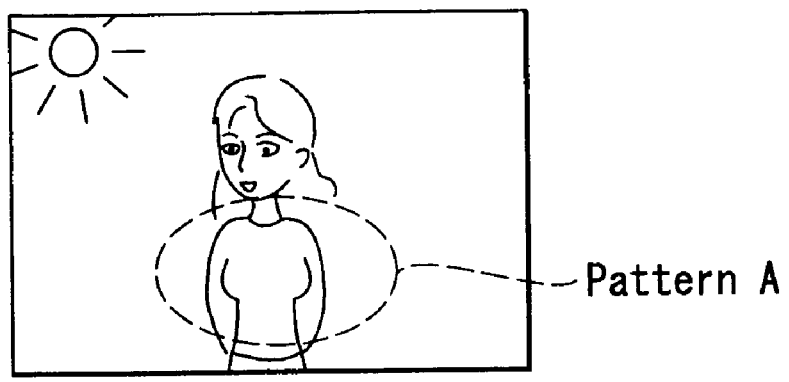
Figure 6B:
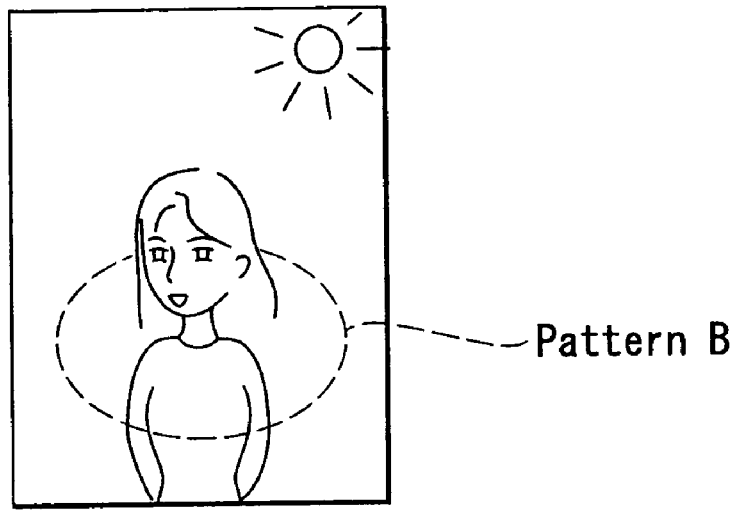
Figure 6C:
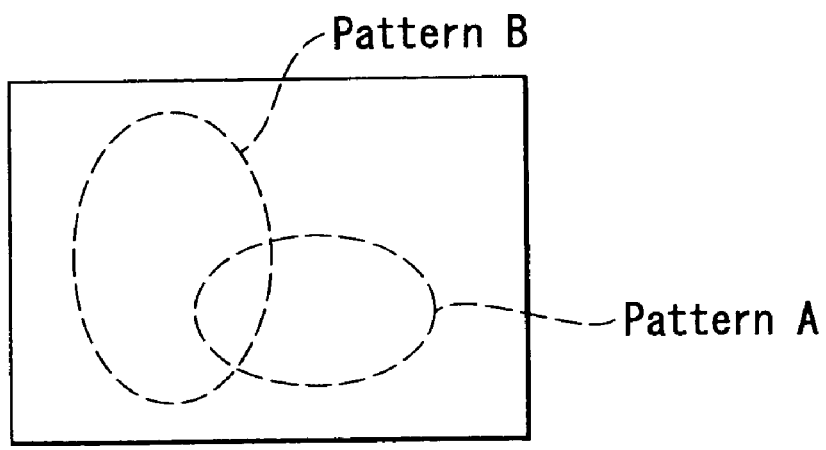

The number of distance measuring points can be increased by the device described above, and the distance of a main object can be accurately measured wherever it is located on a screen. For example, focusing can be accurately executed even if a person is located at an edge of a screen in, for example, a composition as shown in FIG. 6C. Further, in a camera having the sensors shown in FIG. 5A, it is possible, when the camera is held, to determine whether a screen is vertically long or laterally long by a method described below.

There is switching of exposure control as one of applied examples of composition determination. In the respective photographing scenes exemplified in FIGS. 6A and 6B, when it is determined whether the camera is held vertically or laterally or upward or downward and the exposure controller 10 (refer to FIG. 1A) controls exposure using an exposure control sensor most suitable for the photographing situation, the exposure can be properly controlled without being influenced by direct rays from the sun, as shown in the figures. For example, since FIG. 6A shows a laterally long composition, exposure is determined in the region of a pattern A, whereas since FIG. 6B shows a vertically long composition, a pattern B is selected. FIG. 6C shows the relationship between these patterns A and B.

As apparent also in FIGS. 1B and 1C, ordinarily, the upper portion of the screen is not only bright, but also separate from the main object. Thus, it is devised to determine in photographing whether the camera is held so that the screen is made laterally long or vertically long, in consideration of the distributions of brightness and distances in the screen, by making use of the sensors $S_1$ to $S_4$, which is one feature of the embodiment.

Figure 7:
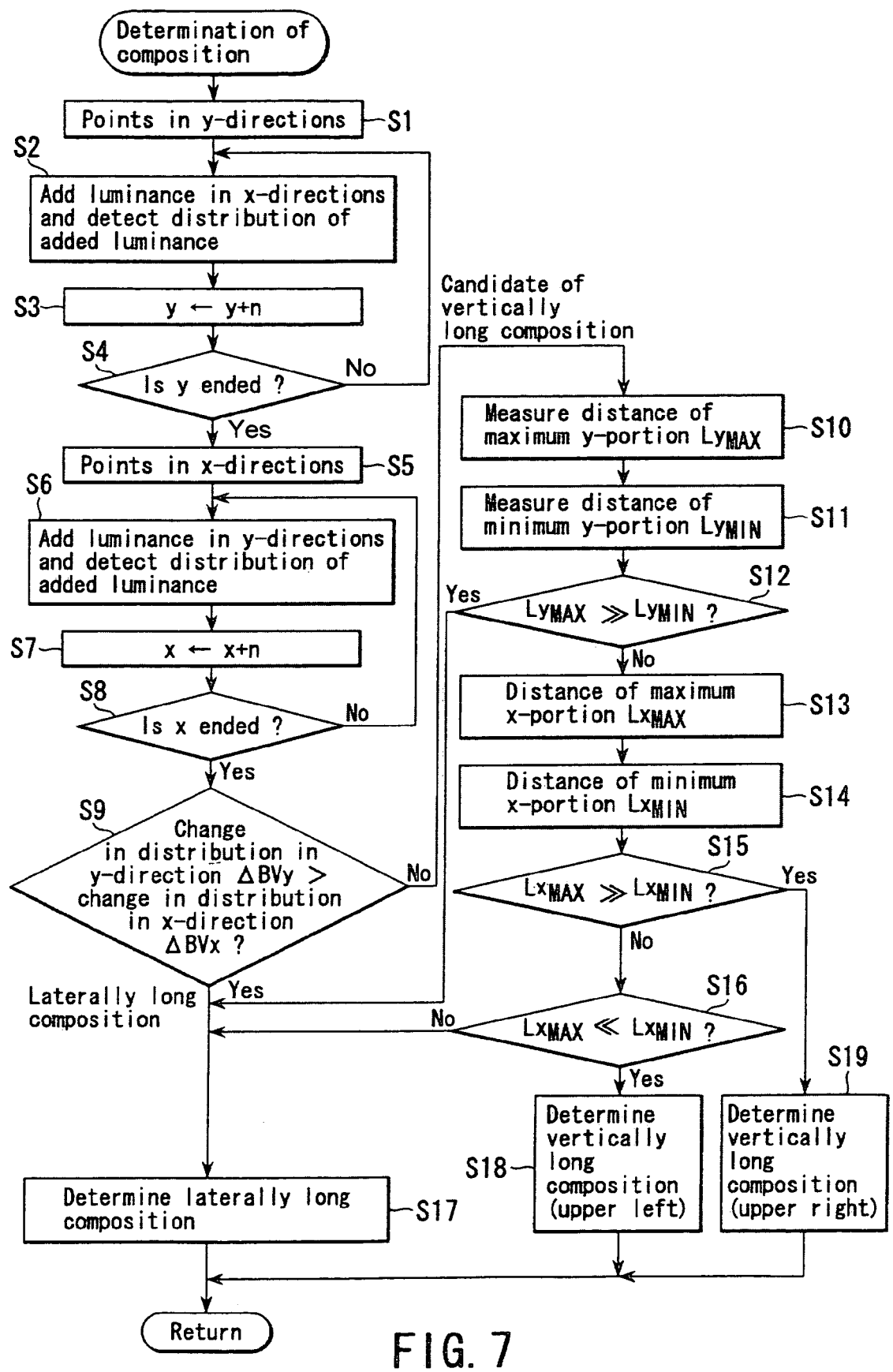
FIG. 7 is a flowchart showing a control sequence of a camera attitude detection method (determination of compositions) using the area sensors.

FIG. 7 shows a flowchart of a control sequence of an AF camera attitude detection method (composition determination method) using the sensors $S_1$ to $S_4$ of the embodiment.

Figure 5B:
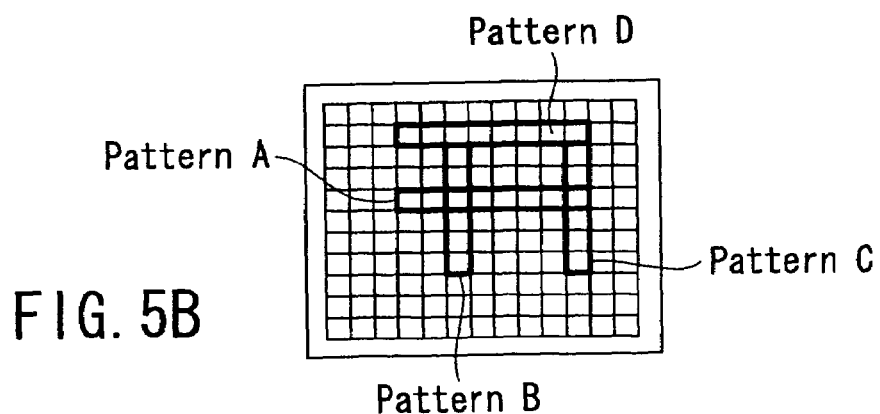
Figure 9A:
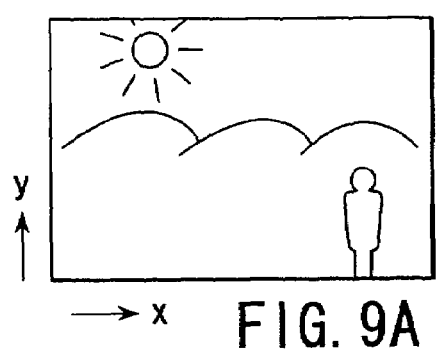
Figure 9B:
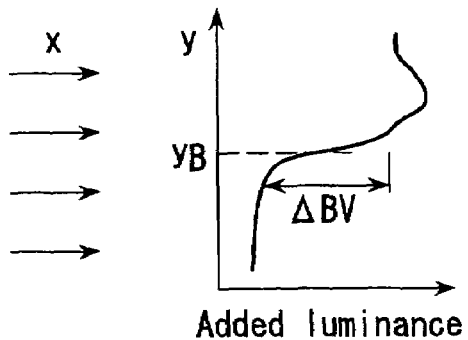

The composition determination sequence is controlled based on a control program (camera sequence program) driven by the CPU 1, and the CPU 1 switches a control method of a certain section of the camera depending upon the result of composition determination. Further, the flowchart is arranged by a concept based on photographing scenes shown in FIGS. 9A and 10A. That is, when a long direction of the screen is denoted as an x-direction and a short direction thereof is denoted as a y-direction, the distribution of the values, which are obtained by adding the pixel data of the same y-coordinates of the area sensors as shown in FIG. 5B along the y-directions that are up/down directions in the photographing scene as shown in FIG. 9A, exhibits a very large amount of a change ($\Delta BV$) as shown in FIG. 9B in a distance measurement pattern, because sky is bright.

Figure 9C:
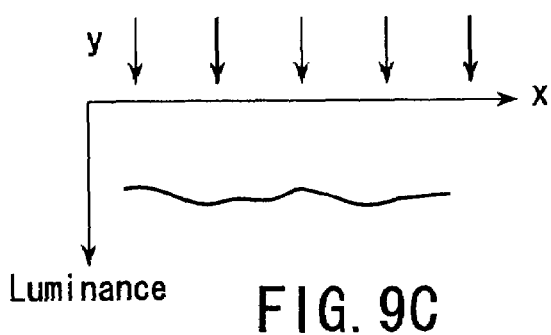
Figure 10A:
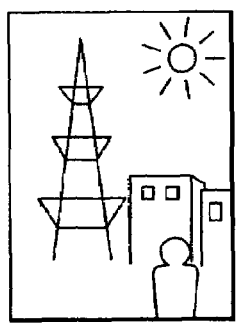
Figure 10B:
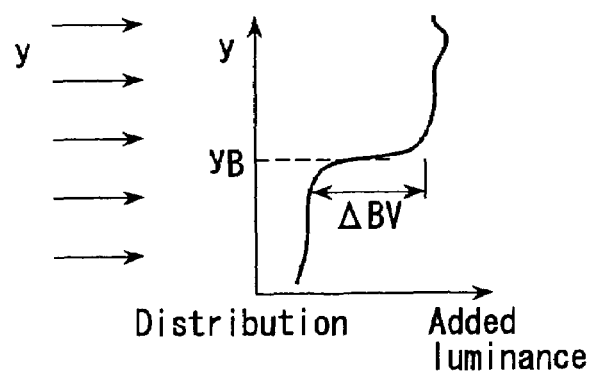
Figure 10C:
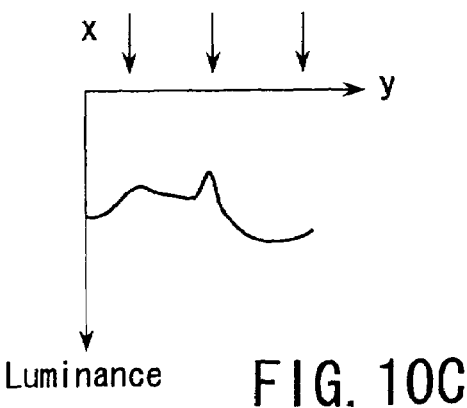

Further, the distribution of the values obtained by adding the pixel data of the same x-coordinates along the x-directions that are right/left directions exhibits less change than the above as shown in FIG. 9C. However, in the photographing scene as shown in FIG. 10A, even if the values obtained by adding the pixel data of the same y-coordinates along the x-directions are examined, the distribution of the values does not exhibit a large amount of change as shown in FIG. 10C, because, for example, sky and a building, a person, and the like on the ground are included in the scene. When the pixel data of the same x-coordinates is added along the y directions, a change in luminance is clearly observed as shown in FIG. 10B because the sky is bright and the portion above the ground is dark. Thus, a large amount of change of data which is expressed by $\Delta BV$ is exhibited. As described above, whether a composition is vertically long or laterally long can be determined by examining the distribution of the added values of the pixel data in the x-directions or the y-directions.

Thus, in FIG. 7, the sensors $S_1$ to $S_4$ add the data of the same y-coordinates from the points of origin in the y-direction to terminal points in the x-directions, and the distribution of luminance of the data is examined. First, in step S1, y-directions are handled as points, luminance is added in x-directions, and the distribution of the added luminance is examined (step S2). The number of the y-coordinates is increased by n in step S3, and distribution of luminance is examined over the entire screen while determining finish of y values (step S4). Actually, however, thinned-out processing is executed to determine the added values of discrete y values in consideration of the processing speed of the CPU 1. Thereafter, the thinned-out processing is executed also in the x-directions likewise in steps S5 to S8.

In the processing flow executed in step S9 and the subsequent steps, the maximum change $\Delta BV_y$ of the added values along the y-directions is compared with the maximum change $\Delta BV_x$ of the added value along the y-directions based on the concept described above, and it is examined whether the camera is held in a vertically long composition or a laterally long composition (Step 9). Generally, laterally long photographs are taken. Thus, when the added values greatly change in the y-directions, the process instantly branches to step S17 and determines that the photograph has a laterally long composition.

However, in other cases it is determined that there is a possibility that the photograph is arranged in a vertically long composition, and the distribution of distances is taken into consideration. In general, while the distribution of brightness can be easily determined, it is difficult to determine the distribution of distances. Thus, the area sensor portions located at extreme ends are used. To further narrow down a candidate, the distances at both the ends in the x-directions and the y-directions are determined. That is, the measured distance values (Lymax, Lymin) at both the ends in the y-directions are determined in steps S10 and S11, and the larger measured distance values is determined in step S12. When the difference between the measured distance values is large, the process branches to step S17 and determines that the photograph is arranged in the laterally long composition.

The measured distance values (Lxmax, Lxmin) at both the ends in the x-directions are determined in steps S13 and S14, and which of the measured distance values is larger is determined in steps S15 and S16.

When the measured distance value Lxmax at the end (right side of the screen) having a large value x is extremely larger than the measured distance value Lxmin at the end (left side of the screen) having a small x value, the process goes to step S19 and determines that the photograph is arranged in a vertically long composition whose upper portion corresponds to the right side of the screen. On the contrary, when the measured distance value Lxmax is much smaller than the measured distance value Lxmin, the process goes to step S18 and determines that the photograph is arranged in a vertically long composition whose upper portion corresponds to the left side of the screen. That is, a composition is determined based on a concept that when distances are measured at the ends of the screen, a portion from which long distance data is output corresponds to an upper portion in an up/down direction. Then, the process returns to a photographing routine.

Note that when the difference between the distances at both then ends in the x-directions is not so large in steps S15 and S16, the process branches to step 17 and determines that the photograph is arranged in the laterally long composition.

Figure 8:
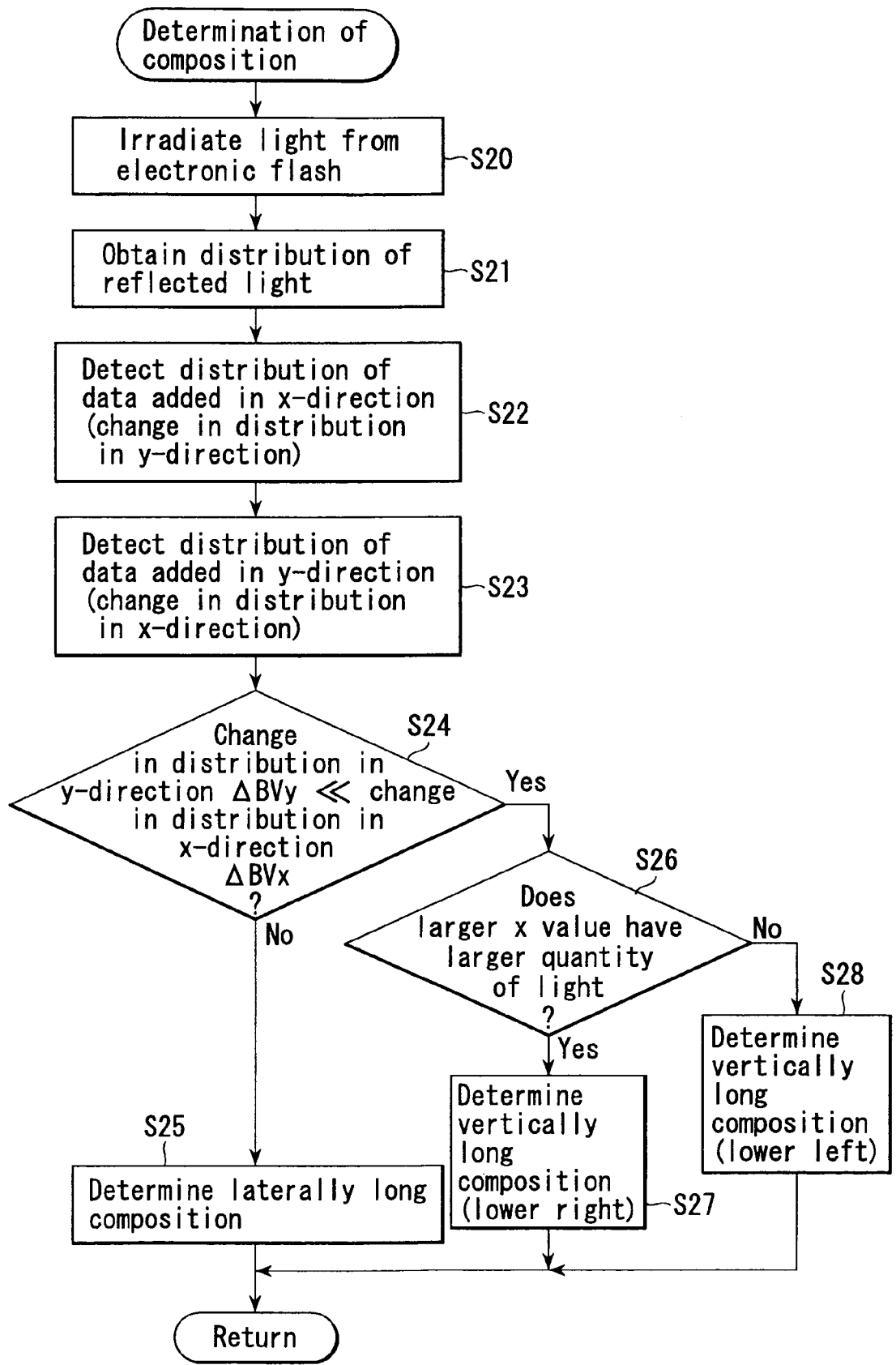
FIG. 8 is a flowchart showing control sequence of a camera attitude detection method (determination of compositions) when photographing is executed in the dark.

Further, as shown in another "composition determination" flowchart exemplified in FIG. 8, when photographing is executed in the dark, light may be projected from the light emission unit 9a by controlling the electronic flash circuit 9 (step S20), and the distribution of reflected light obtained from the area sensors at the time may be determined (step S21), thereby a composition can be determined based on a concept similar to that described above.

Steps S22 and S23 in FIG. 8 correspond to steps S1 to S4 and steps S5 to S8 in FIG. 7, and the processing executed at the steps in FIG. 8 are the same as that executed at the steps in FIG. 7 except that the distribution of reflected light is determined in place of the distribution of the luminance. In step 24, the change in distribution of the reflected light in the y-directions is compared with that in the x-directions, and it is determined that a photograph is arranged in a vertically long composition only when the change in distribution of the reflected light in the x-directions is much larger than that in the y-directions in steps S26 to S28. However, it is determined that the photograph is arranged in a laterally long composition in the cases other than the above (step S25), and the process returns to the photographing routine.

When it is determined that the photograph is arranged in the vertically long composition, a large quantity of reflected light is ordinarily obtained in a shorter distance. Thus, the process determines an up/down relation by branching to step S28 based on a concept that a portion having a large quantity of light has a short distance and a portion having a small quantity of light has a long distance (located upward). According to the above concept, since the distribution of brightness (reflected light) corresponds to the distribution of distances, a composition can be determined more promptly than in the flowchart of FIG. 7.

Note that the determination may be executed by diverting image pickup elements in place of the dedicated sensors.

A method of processing a digital image obtained by the photographing element 12 and the A/D converter 1a through the photographing lens 11 of FIG. 1A is switched by determining whether a composition is vertically long or laterally long as described above, thereby an image display method, when the image is displayed, can be improved.

FIGS. 11A and 11B exemplifies external appearances of a digital camera 101 to which the present invention is applied. FIG. 11A is a view when the digital camera 101 is observed from a front side thereof. The light receiving lenses 3a and 3b of a distance detection means composed of the sensor arrays 2a and 2b, which is a feature of the embodiment, and the light emission unit 9a are disposed on a front surface of the camera, in addition to the photographing lens 11.

A release switch 102 is disposed on an upper surface of the camera, and the monitor liquid crystal display 16 is disposed on a back surface thereof as shown in FIG. 11B. Further, a connector 103 is disposed on a side of the camera and connected to a television 104 so that an image photographed by the camera can be displayed thereon.

Figure 13A:
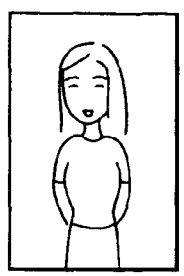
Figure 13B:
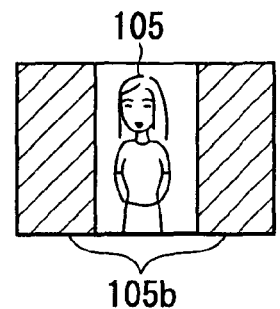
Figure 13C:
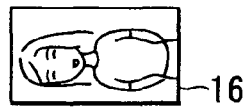

The camera of the embodiment is characterized in that an image on the liquid crystal display (LCD) 16 is different from an image on a display 105 of the television 104. That is, since the LCD 16 is small in size, the image must be effectively displayed thereon so that it can be observed in detail. In contrast, the television has a large screen, and it is hard to observe when an image having a vertically long composition is displayed laterally. Accordingly, it is preferable to display a scene even if it is a vertically long photographed scene as shown in FIG. 13A on the screen of the television and a personal computer with the upper and lower directions thereof in alignment with those of the screen as shown in FIG. 13B. In contrast, it is preferable to display the image on the LCD 16 incorporated in the camera with its long directions in alignment with the long directions of the screen as shown in FIG. 13C.

To realize the function described above, photographing is executed according to the sequence of a flowchart shown in FIG. 12. Note that a "photographing" routine shown here is a subroutine called by a main routine as a not shown camera sequence, and the "composition determination" routine described above is called. That is, step S30 is a processing step for the composition determination which is a feature of the present invention, step 31 is processing step for measuring the distance of a main object, and step S32 is processing step for exposure control including an electronic flash control or processing step for measuring white balance control light.

Subsequently, focusing and the exposure control are executed by the focusing means 4 and the exposure controller 10 of FIG. 1 in steps S33 and S34 according to results of above steps.

Thereafter, image processing control is executed in the image processing section 14 of FIG. 1A in steps S35 and S36 to record an image in the memory 15. At this time, the image processing is executed in consideration of the result of composition determination. That is, this is a method of arranging the image as shown in FIG. 13B. Essentially, portions 105b different from the photographed image is compressed as a part of the image and recorded in step S36.

When the photographed image is displayed on the monitor, it is determined in step S37 whether or not the image has a vertically long composition, and only when the image has a laterally long composition, it is displayed on the LCD 16 as it is recorded (step S39). When, however, the recorded image having the vertically long composition is displayed as it is, it is very difficult to observe the image on the small LCD 16 because both the sides of an object are not displayed as shown by the portions 105b of FIG. 13B. To cope with this problem, only the portion of an original image 105 is extracted and displayed with the longitudinal directions thereof aligned with the long directions of the display (step 38).

Figure 14:
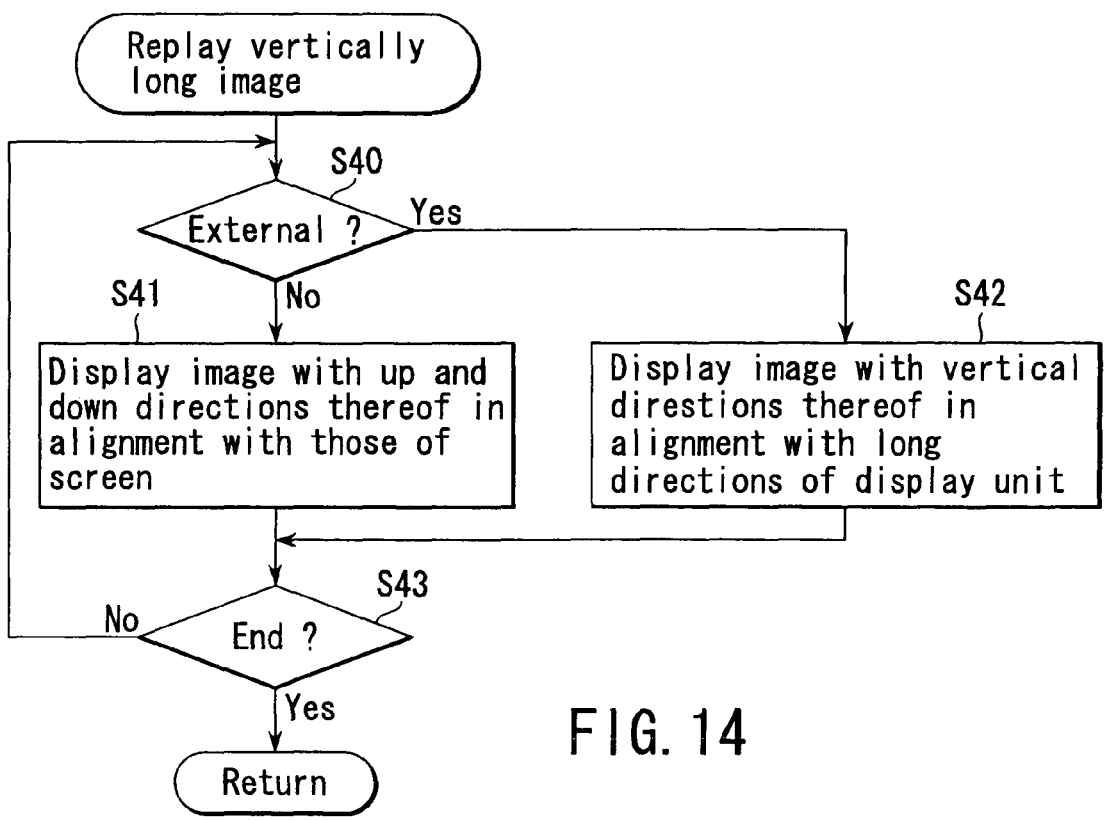
FIG. 14 is a flowchart of a routine showing a sequence which executes "replay of vertically long image" of the embodiment.

Further, referring to FIG. 14, when a vertically long recorded image is replayed, whether or not the image is to be displayed externally is determined depending upon whether or not the camera is connected to a connector (step S40) (making use of a port and the like of the CPU 1). When the image is to be displayed externally, it is displayed with its upper and lower directions aligned with the upper and lower directions of a display unit (step S41), otherwise it is displayed on the incorporated liquid crystal display with its longitudinal directions aligned with the long directions of the display (step S42) as shown in FIG. 14.

As explained above, according to this embodiment, there can be provided the electronic camera which does not require a special operation when a recorded image is displayed on personal computers and televisions.

(Modification)

The embodiment described above may be modified as explained below. When an image is compressed in the embodiment described above, image processing is carried out including a portion where no image is photographed (the portions 105b in FIG. 13B). Accordingly, there is a possibility that the image is deteriorated in quality, depending upon a ratio of compression. To improve the above embodiment, a modification will be described below.

For example, photographing having a sequence as shown in a flowchart of FIG. 15, which will be explained next, may be applied to users who actually print a photographed image or use it as a seal.

Figure 15:
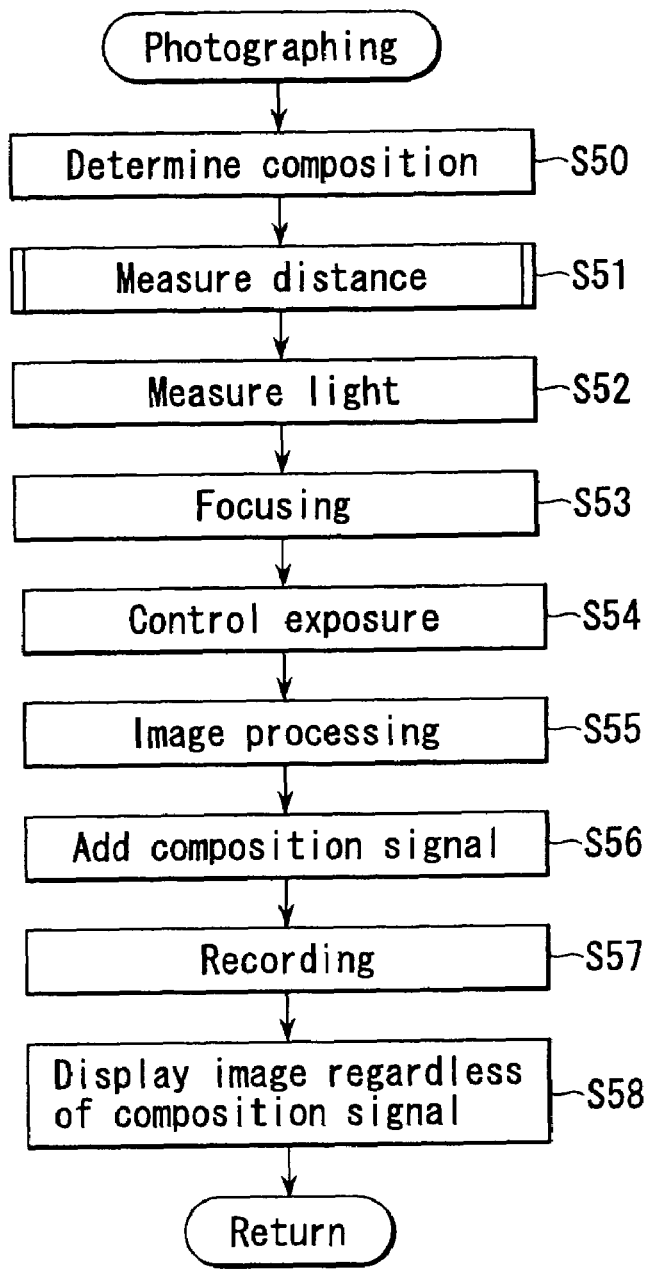
FIG. 15 is a flowchart of a routine showing a sequence as a modified example which executes "photographing"

Focusing and exposure control are executed in steps S50 to S54 of the "photographing" flowchart of FIG. 15 in the same sequence as that of steps S30 to S34 of the "photographing" flowchart of FIG. 12. At subsequent steps S55 to S58, however, first, image processing is executed (step S55) without taking information of longitudinal/lateral composition into consideration, and a composition signal is added to image information (step S56) prior to recording (step S57).

According to the above method, an image can be displayed as it is (step S58) regardless of the composition signal when a photographed image is confirmed thereafter. When the image is replayed, the CPU 1 employs the "vertically long image replay" flowchart in FIG. 14 as it is and displays the image with its upper and lower directions aligned only when it is displayed externally. At this time, the portions 105b as shown in FIG. 13B, which are absent in the photographed image, are added. It is needless to say that the concept of this embodiment, in which composition is taken into consideration (priority is given to upper/lower directions) is also applicable to a case in which an image is displayed in a device such as a mobile phone having a vertically long screen.

Figure 16:
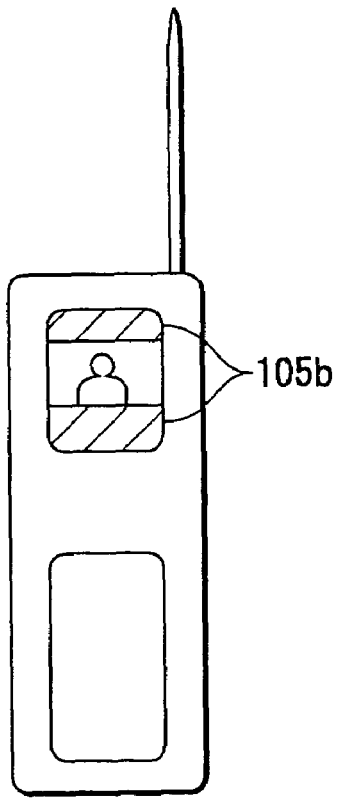
FIG. 16 is a front elevational view of a mobile phone terminal having a vertically long display screen.

FIG. 16 shows a mobile phone terminal in which an image photographed in a laterally long composition is displayed on an external display having a vertically long screen. The portions 105b are absent in the photographed image, and the photographed image is displayed with blank portions added thereto according to a display mode of an external device (device other than a camera).

Figure 17:
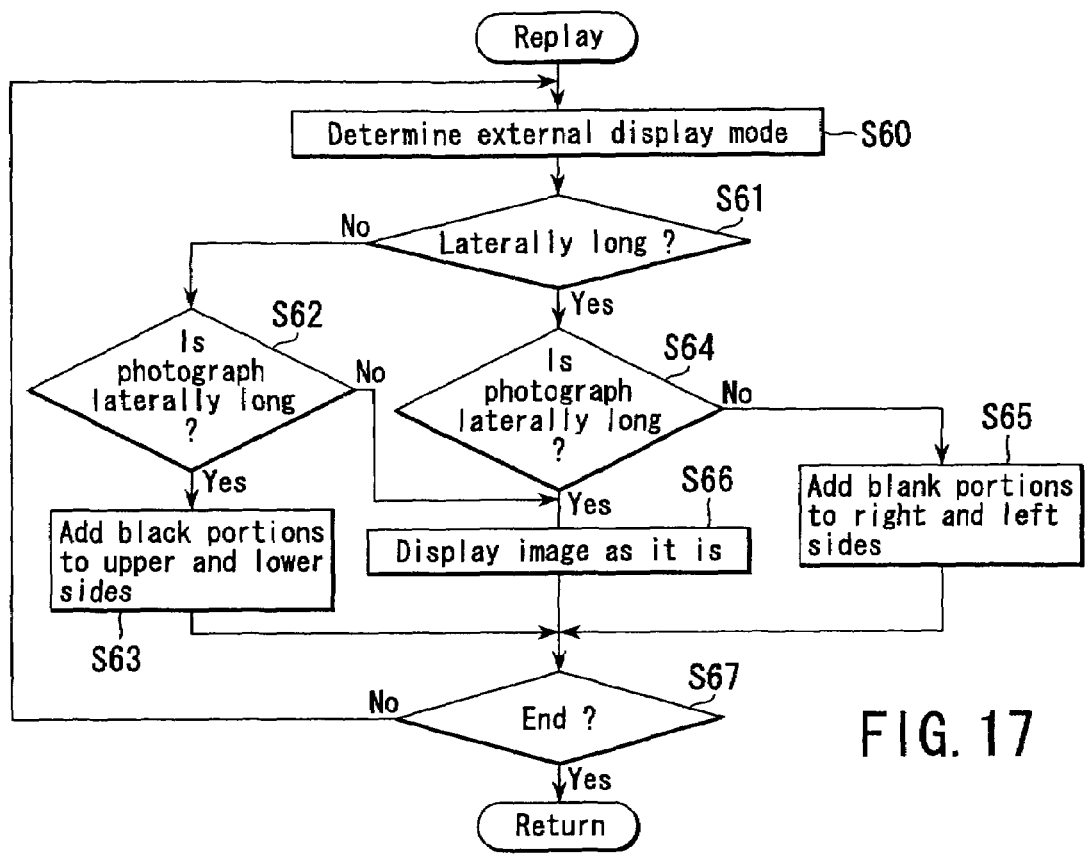
FIG. 17 is a flowchart of a routine showing a sequence as a modified example which executes "replay (display)"

That is, as shown in a "replay (display)" flowchart of FIG. 17, in steps S60 to S65, the display mode of an external device is determined first (step S60). However, this determination may be carried out manually. Whether this display mode is vertically long or laterally long is determined (steps S61, S62, and S64), and the result of determination is examined against the result of determination of the composition of a photograph, which is a feature of the present invention. When the relationship between longitudinal and lateral directions agree between the display mode and the composition, the image is displayed as it is (step S66). Otherwise processing is executed so as to add upper and lower or right and left blank portions to the image (steps S63 and S65).

Execution of the modification as described above not only makes a special operation unnecessary when a recorded image is displayed, but also can realize an electronic camera capable of naturally displaying and printing an image, regardless of a mode in which the image is displayed, on external televisions and the like, and printed by external printers and so on.

Second Embodiment

Figure 18:
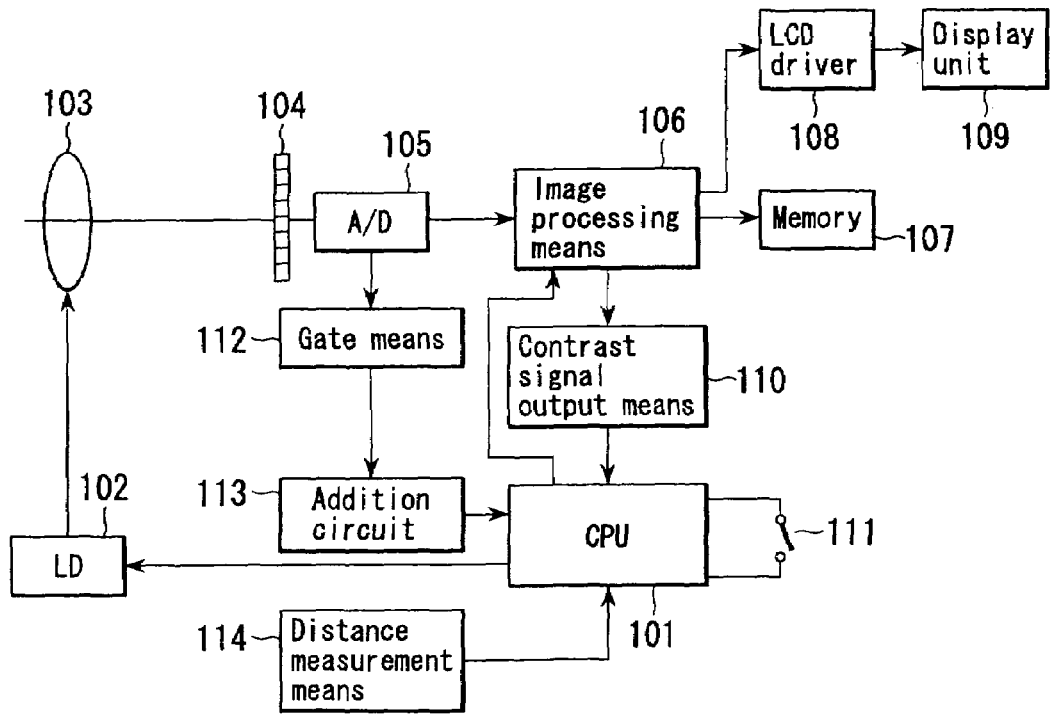
FIG. 18 is a block diagram showing a device for determining a photographing composition of an electronic camera according to a second embodiment of the present invention.

FIG. 18 is a block diagram of a device which determines a photographing composition of an electronic camera according to a second embodiment of the present invention. The second embodiment is characterized in that a photographing composition is determined making use of an autofocusing (AF) device employing a so-called mountain climbing method in which the distance information of an object is detected from the relationship between the contrast information of an electric image signal obtained from a photographing element 104 through a photographing lens 103 and the focusing position of the photographing lens 103.

An output from the photographing element 104 is converted into a digital signal through A/D conversion means 105, subjected to image processing such as color balance processing, edge emphasis processing, and the like by image processing means 106, compressed, and then recorded in a memory 107. The content recorded in the memory 107 can be visually confirmed on a display unit 109 composed of an LCD and the like through an LCD driver 108.

A signal as to the contrast of an image is fetched from the image processing means 106 through a contrast signal output means 110 as to each certain area in a screen and supplied to a CPU 101. Further, a signal corresponding to the brightness of the image at a certain pixel portion is fetched from the A/D conversion means 105 through gate means 112. After the signal is added by addition means 113, it is supplied to the CPU 101 in which it is used as information that exhibits the brightness of a predetermined area in the screen.

Figure 19:
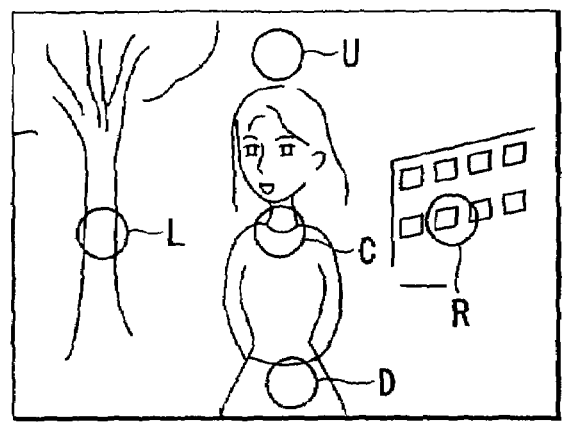
FIG. 19 is a view showing five points in a screen where contrast information and brightness information are detected.

The CPU 101 can detect the contrast information and brightness information at five points (C, L, R, U, and D portions) in the screen as shown in FIG. 19. The CPU 101 is composed of a micro controller and can execute calculation control by means of a certain program. The CPU 101 controls a photographing sequence by determining a user's operation depending upon an input state of a release switch 111. Distance measurement means 114 measures a distance to an object. A lens drive (LD) unit 102 brings the photographing lens 103 into focus based on the result of distance measurement executed by the distance measurement means 114.

Figure 20:
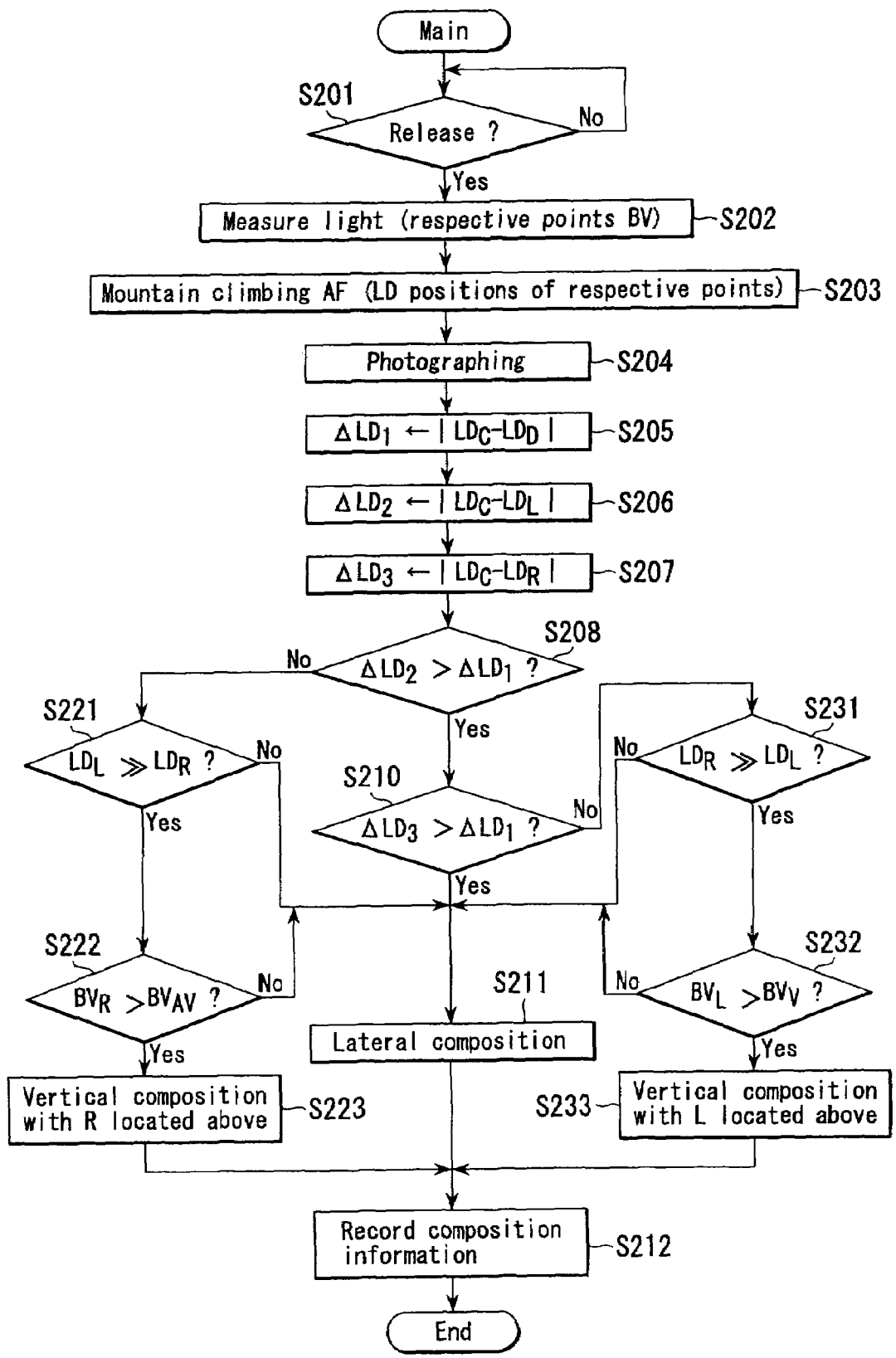
FIG. 20 is a main flowchart which explains photographing sequence control according to the embodiment in detail.

FIG. 20 is a flowchart that explains photographing sequence control according to the embodiment in detail. The input state of the release switch 111 is detected in step S201, thereby the brightness information corresponding to the respective points C, L, R, U, and D of FIG. 19 is detected. That is, an output from the photographing element 104 is fetched through the A/D conversion means 105 and the gate means 112 and used as a result of light measurement BV (step S202).

Figure 21:
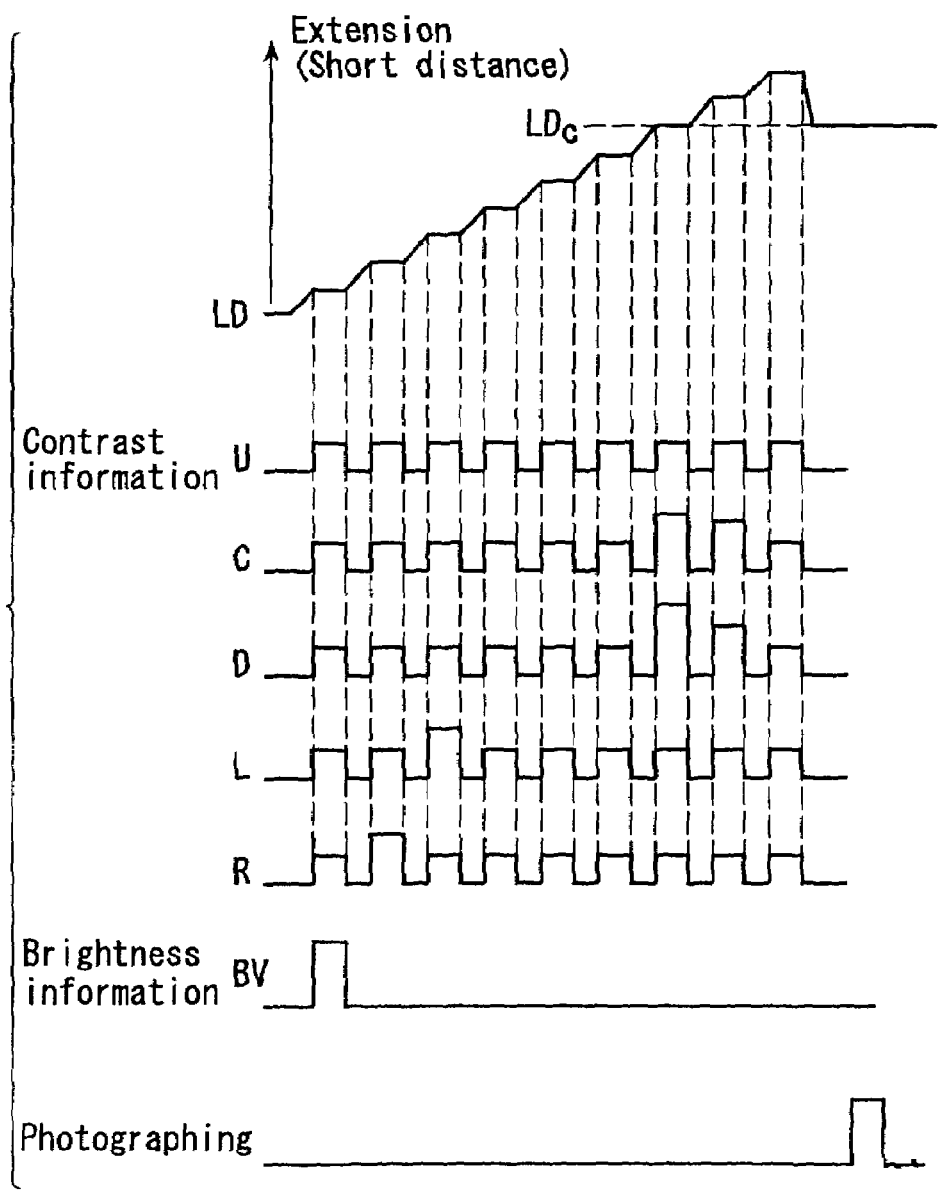
FIG. 21 is a timing chart of a sequence when focusing lens control (LD) of a photographing lens 103 is executed.

Next, an output from the contrast signal output means 110 is monitored while executing focusing control of the photographing lens 103 (LD) based on a timing chart shown in FIG. 21 using the method called mountain climbing automatic focusing (AF) (step S203). This contrast information is determined in correspondence to the respective points in the screen shown in FIG. 19, and a higher degree of focusing results in higher contrast information.

On the other hand, since an amount of extension of the photographing lens 103 corresponds to the inverse number of the distance to the object, a larger amount of extension corresponds to a shorter distance. That is, in the screen shown in FIG. 19, since a person as the object is located at a position having a shortest distance, high contrast information is exhibited at the points C and D when the photographing lens 103 is extended in a large amount. Further, sky, which acts as a background at the point U in the screen shown in FIG. 19, has no contrast, and the points L and R, which are distant landscapes far from the person, output a high contrast signal when the photographing lens 103 is extended in a small amount.

The LD positions at which the respective points exhibit high contrast can be determined by the mountain climbing AF process. In the flowchart of FIG. 20, the lens control (LD) positions, at which the respective points exhibit a high contrast, are denoted by $LD_C$, $LD_L$, $LD_R$, $LD_U$, and $LD_D$ with respect to the points C, L, R, U, and D, and the distances of the respective points are calculated from the high contrast LD positions thereof.

As to points such as the sky and the like whose contrast cannot be obtained at any LD position, an extended position corresponding to an infinite distance is shown as the LD position thereof in the flowchart. Since a point nearest to an object can be found by the hill mounting AF method, photographing is carried out by bringing the photographing lens 103 into focus with respect to the point (lens is controlled to the position having highest contrast) (step S204). FIG. 21 shows photographing which is carried out while bringing the photographing lens 103 into focus with respect to the point C in the screen shown in FIG. 19 assuming that an LD position having highest contrast is denoted by $LD_C$.

As described above, since the information corresponding to the distances of the respective points is obtained as the LD position information, the distances of the LD positions of the other points, $LD_D$, $LD_L$, and $LD_R$, which are apart from the LD position of the point C where the focusing is executed, are detected in steps S205 to S207. Larger differences between the point C and the other points result in larger differences between the distances of the points.

It is contemplated that the smallest one of the thus obtained $\Delta LD_1$ to $\Delta LD_3$ corresponds to a point below a main object. That is, to describe this as to the example shown in FIG. 19, the point D shows the same object, shows a shortest distance to the point C, and has a smallest value of $\Delta LD_1$. Accordingly, steps S208 and S210 are branched to "Y" and a laterally long composition is determined in step S211.

Further, when photographing is executed in a vertically long composition, it is contemplated that the upper portion of a screen has a longer distance than the lower portion thereof and a sky portion is brighter than average brightness, and it is determined which of right and left sides corresponds to an upper portion in the vertically long composition in steps S208, S210, S221, S222, S231, and S232.

That is, the process branches from step S208 to step S222 when it is determined that the point L is located at a position having a more equal distance than the point D with respect to the LD position $LD_C$ of the object at the center, and, in this case, there is a possibility that the point L is located below or the point R is located above.

However, the positions of the points L and R cannot be sufficiently determined based on only the possibility. Thus, when it is determined that $LD_R$ is located at a sufficiently far position like sky (which is less bright) in step S221 and that the brightness $BV_R$ of the point R is larger than the average brightness $BV_{AV}$ in the screen in step S222, it is determined that the point R certainly shows a sky portion and that the point L is located below, whereby it is determined in step S223 that the vertically long composition is a composition having the point R located above.

Further, when step S210 is branched to "N", the same determination is executed in steps S231 and S232 to confirm that the vertically long composition is a composition having the point L located above, and the vertically long composition having the point L located above is determined in step S233 by branching both steps S231 and S232 to "Y". Then, the composition information in the photographing is stored in the memory 107 of FIG. 18 in step S212.

As described above, in this embodiment, longitudinally and laterally long compositions can be determined only by an output from the photographing image pickup element effectively utilizing the mountain climbing AF method without using a special sensor.

Further, when the mountain climbing AF method is executed to all the five points in the screen, a contrast peak must be detected as to all of these points, which takes a long time, as well complex calculations.

Figure 22:
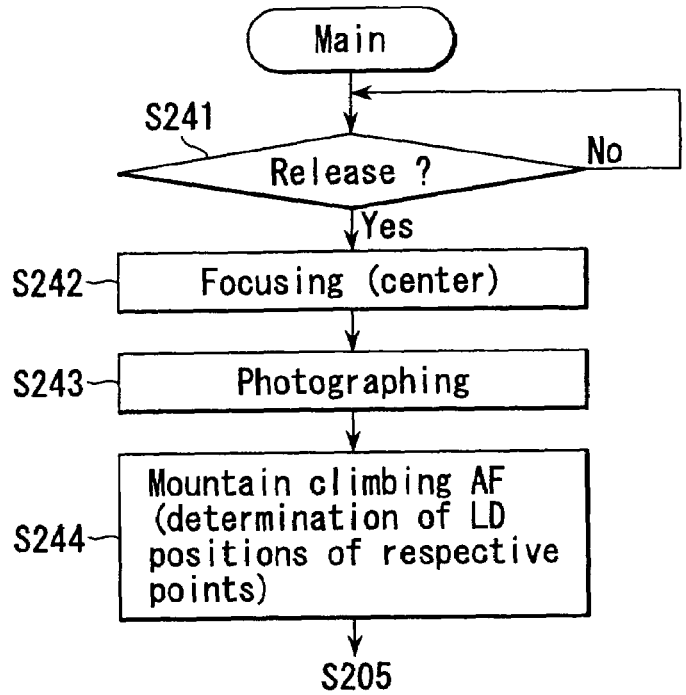
FIG. 22 is a main flowchart in which it is intended to reduce a release time lag by executing mountain climbing autofocusing only on a central point in a screen.

To cope with the above problem, in the following processing, a release time lag may be reduced by executing the mountain climbing AF method only to the central point in the screen and detecting the mountain climbing contrast of all the points on the completion of photographing. The above specification may be employed when emphasis is placed on the time lag because the main object exists at the center in the screen in many cases. FIG. 22 shows an example of a flow of the embodiment in this case.

That is, when a release operation is determined in step S241, the photographing lens 103 is brought into focus at a position where the contrast of the central point is maximized as described above in step S242, and photographing is executed in step S243. Then, mountain climbing autofocusing is executed to all the photographed points together so as to detect the contrast of all the points (refer to FIG. 21). With this operation, the distribution of distances of the respective points in the screen is determined by determining the LD positions at which the respective points have high contrast, thereby a composition is determined by executing processing similar to that of the flow in step S205 and subsequent steps of FIG. 20.

There can also be provided a digital camera in this embodiment which automatically determines longitudinally and a laterally long compositions without the need of a special sensor and has a small time lag.

Figure 23A:
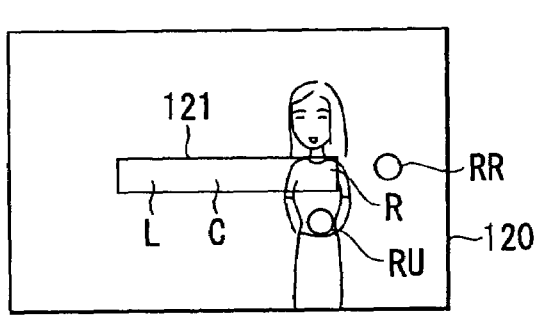
FIG. 23A is a view showing a laterally long composition.
Figure 25:
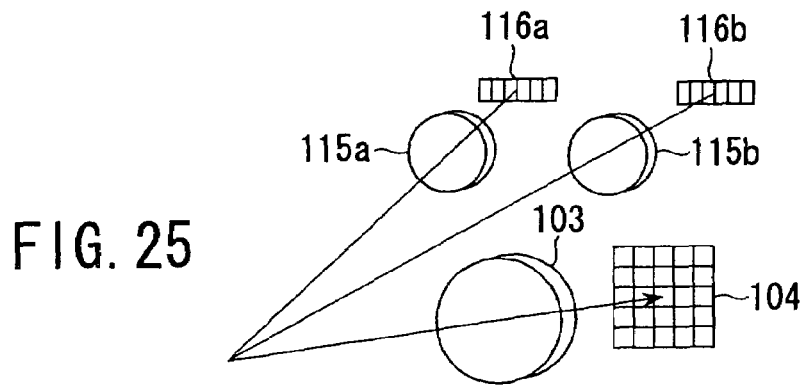
FIG. 25 is a view showing an arrangement of a distance measurement device using light paths different from that of the photographing lens 103.

Moreover, there is also known a camera having the distance measurement means 114 shown in FIG. 18 or a distance measuring device shown in FIG. 25 which uses a light path different from that of the photographing lens 103 to cope with a time lag in mountain climbing AF. In this type of camera, the distance measurement device ordinarily measures the distances of objects existing at a plurality of lateral points (here, L, C, and R) in a screen 120 as shown in FIG. 23A making use of a pair of line sensors 116a and 116b that receive light through both light receiving lenses 115a and 115b shown in FIG. 25. In FIG. 23A, the range surrounded by reference numeral 121 is a monitor area in which distances can be measured by the distance measurement device.

When a main object exists in the portion R of FIGS. 23A and 23B, even if it is desired to determine the up/down direction of a screen by the distribution of distances of a potion below the main object or the brightness information of a portion thereabove, the distance measurement device does not monitor the areas of the portions. Therefore, a novel idea is necessary to determine the up/down direction.

Figure 23B:
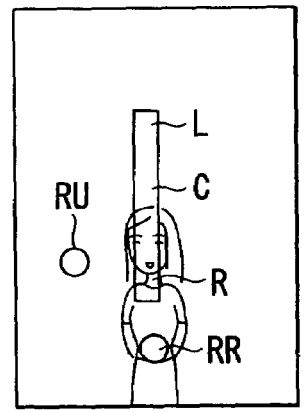
FIG. 23B is a view showing a vertically long composition.
Figure 24:
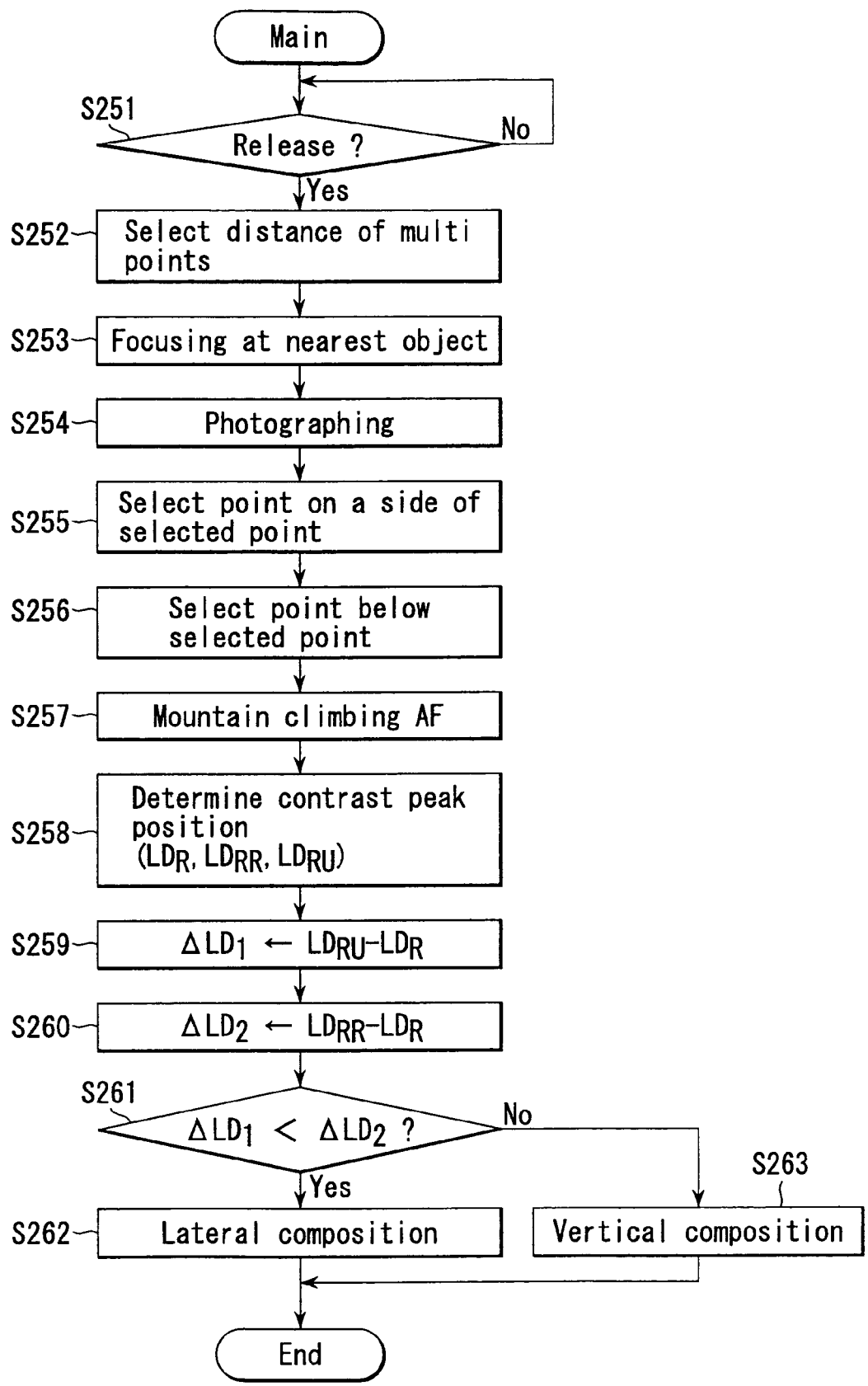
FIG. 24 is a flowchart which determines a laterally long composition and a vertically long composition.

In this embodiment, whether the screen is used in a laterally long composition (FIG. 23A) or in a vertically long composition (FIG. 23B) is determined using a flowchart as shown in FIG. 24.

In FIG. 24, when a release operation is determined in step S251, the distances of the plurality of the points L, C, and R in the figure are measured by the distance measurement device in step S252. In step S253, the point having the shortest distance is selected, the photographing lens 103 is brought into focus with the selected distance, and photographing is executed in step 254. Thereafter, in step S257 and subsequent steps, the distances of the respective points are compared with each other by the contrast determination using the mountain climbing method as described in FIG. 21. Prior to the comparison, however, in steps S255 and S256, areas located on a side of and below the point selected as the result of distance measurement executed in step S252 (portions RR and RU in the example of FIG. 23A) are selected as contrast monitor areas.

In step 257, determination of contrast starts in step 257 using the mountain climbing method described above, and an LD position, at which the contrast information of the image with respect to the selected point and to the points determined in steps S255 and S256 has a peak, is determined in step 258. Next, in steps S259 and S260, the difference between the selected point for focusing (R in the lateral screen shown in FIG. 23A) and the point on the side thereof (RR) and the difference between the selected point R and the point below it (RU) (converted by the lens position difference $\Delta LD$) are determined, and it is determined in step S261 that the points having a smaller difference in the same object are arranged in an up/down direction in the same object. Thus, whether the screen is used in the laterally long composition or in the vertically long composition is determined by branching to steps S262 or S263.

That is, in the laterally long composition as shown in FIG. 23A, since the difference between the point R and the point RU is smaller than the difference between the point R and the point RR, that is, $\Delta LD_1 < \Delta LD_2$, step S261 is branched to "Y", whereas in the example of the laterally long composition of FIG. 23B, since $\Delta LD_2 < \Delta LD_1$, step S261 is branched to "N", and it is determined in step S363 that the screen is used in the vertically long composition. Even if the external light type distance measurement device is combined with the distribution of distance detection system employing the mountain climbing method (distance determination method making use of the relationship between the LD positions and the contrast information), it is possible to execute the automatic composition determination that is the object of the present invention. According to this embodiment, there is an advantage that a time lag until photographing is executed is short so that a shutter chance is not missed. Further, an application in which brightness information is added is also available.

As described above, according to this embodiment, since whether a camera is held in a laterally long composition or in a vertically long composition is determined when photographing is executed by the camera, and the vertical directions of an image are aligned with those of a screen. Accordingly, the image can be easily displayed. Since users can detect whether the composition of the image is vertically long or laterally long without executing a special operation, they can obtain an easily viewable image by properly arranging it longitudinally and laterally when it is displayed on a television and the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A photographing composition determination apparatus for an electronic camera, comprising:
    an image sensor having a plurality of light receiving elements and disposed in an area shape so as to correspond to a photographing scene;
    a light receiving lens which introduces an object image to the image sensor;
    an A/D converter which converts analog signals output from the respective light receiving elements of the image sensor into digital data; and
    a controller which detects the distribution of luminance and the distribution of distances in the photographing scene based on the digital data output from the A/D converter and determines a photographing composition according to the distribution of the luminance and the distribution of the distances, the controller determining whether or not the photographing composition is laterally long, based on the distribution of the luminance, and determining an upper part of a vertically long composition according to the distribution of the distances, when determining that the photographing composition is not laterally long.

2. A photographing composition determination apparatus for an electronic camera according to claim 1, wherein the light receiving lens comprises a pair of optical systems, the image sensor is divided into two areas in order to receive a pair of object images through the pair of optical systems, and the controller processes an output signal from the image sensor based on a principle of triangulation and calculates distance information at a plurality of points in the photographing scene.

3. A photographing composition determination apparatus for an electronic camera, according to claim 1, wherein the light receiving lens is a photographing lens which is adjustable in focus, and the controller detects contrast between a plurality of points in the photographing scene based on the digital data output from the A/D converter, and detects the distribution of the distances in accordance with a relationship between contrast information indicating the contrast and the focus of the photographing lens.

4. A photographing composition determination method, comprising:
    accepting digital image data;
    determining a distribution of luminance in a photographing scene based on the accepted digital image data;
    determining a distribution of distances in the photographing scene based on the accepted digital image data; and
    determining an orientation of a photographing composition, including
        determining whether or not the photographing composition is laterally long, based on the distribution of the luminance, and
        if it was determined that the photographing composition is not laterally long, then determining an upper part of a vertically long composition according to the distribution of the distances.

* * * * *